United States Patent
Park et al.

(10) Patent No.: US 11,512,973 B2
(45) Date of Patent: Nov. 29, 2022

(54) METHOD AND DEVICE FOR OUTPUTTING LANE INFORMATION

(71) Applicant: Samsung Electronics Co., Ltd., Gyeonggi-do (KR)

(72) Inventors: Sahng-gyu Park, Gyeonggi-do (KR); Hyun-seok Hong, Gyeonggi-do (KR); Myung-sik Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 342 days.

(21) Appl. No.: 16/482,044

(22) PCT Filed: Jan. 19, 2018

(86) PCT No.: PCT/KR2018/000902
§ 371 (c)(1),
(2) Date: Jul. 30, 2019

(87) PCT Pub. No.: WO2018/143589
PCT Pub. Date: Aug. 9, 2018

(65) Prior Publication Data
US 2020/0064148 A1 Feb. 27, 2020

(30) Foreign Application Priority Data
Feb. 3, 2017 (KR) .......................... 10-2017-0015688

(51) Int. Cl.
*G01C 21/36* (2006.01)
*G06T 7/50* (2017.01)
(Continued)

(52) U.S. Cl.
CPC ............ *G01C 21/365* (2013.01); *B60K 35/00* (2013.01); *B60R 1/12* (2013.01); *G06K 9/628* (2013.01);
(Continued)

(58) Field of Classification Search
CPC .......... G01C 21/365; G06T 7/50; G06T 7/70; G06T 2207/30256; B60K 35/00;
(Continued)

(56) References Cited

U.S. PATENT DOCUMENTS 6,292,752 B1 9/2001 Franke et al.
6,300,865 B1 10/2001 Fechner et al.
(Continued)

FOREIGN PATENT DOCUMENTS

JP 2007-122578 5/2007
JP 2015-001773 1/2015
(Continued)

OTHER PUBLICATIONS

"Multi-lane perception using feature fusion based on GraphSLAM", 2016 IEEE/RSJ International Conference on Intelligent Robots and Systems (IROS), IEEE, Oct. 9, 2016 (Oct. 9, 2016), pp. 3108-3115, XP033011831, DOI: 10.1109/IROS.2016.7759481.*
(Continued)

*Primary Examiner* — James M Pontius
(74) *Attorney, Agent, or Firm* — The Farrell Law Firm, P.C.

(57) ABSTRACT

A vehicle driving assistance device includes: a sensing unit configured to capture a front image of a running vehicle; a processor configured to detect a lane by using the front image and estimate the lane by detecting objects around a road, on which the vehicle is running, by using the sensing unit; and an output unit configured to output the estimated lane.

14 Claims, 22 Drawing Sheets

(51) Int. Cl.
*G06T 7/70* (2017.01)
*B60K 35/00* (2006.01)
*B60R 1/12* (2006.01)
*G06K 9/62* (2022.01)
*G06V 20/56* (2022.01)

(52) U.S. Cl.
CPC .............. *G06T 7/50* (2017.01); *G06T 7/70* (2017.01); *G06V 20/588* (2022.01); *B60K 2370/1529* (2019.05); *B60K 2370/1534* (2019.05); *B60K 2370/182* (2019.05); *B60K 2370/21* (2019.05); *B60K 2370/31* (2019.05); *B60R 2001/1215* (2013.01); *B60R 2001/1253* (2013.01); *B60R 2300/205* (2013.01); *B60R 2300/207* (2013.01); *B60R 2300/301* (2013.01); *B60R 2300/302* (2013.01); *B60R 2300/304* (2013.01); *B60R 2300/50* (2013.01); *B60R 2300/804* (2013.01); *B60R 2300/8086* (2013.01); *B60R 2300/8093* (2013.01); *G06T 2207/30256* (2013.01)

(58) Field of Classification Search
CPC ........ B60K 2370/1529; B60K 2370/31; B60K 2370/1534; B60K 2370/182; B60R 1/12; B60R 2001/1215; B60R 2001/1253; B60R 2300/205; B60R 2300/207; B60R 2300/301; B60R 2300/302; B60R 2300/304; B60R 2300/50; B60R 2300/804; B60R 2300/8086; B60R 2300/8093; G06K 9/00798; G06K 9/628; B60W 40/02; B60W 40/105; B60W 50/14; B60W 2420/42; B60W 2420/52; B60W 2050/143; B60W 2050/146
See application file for complete search history.

(56) References Cited

U.S. PATENT DOCUMENTS

| | | | |
|---|---|---|---|
| 6,567,039 | B2 | 5/2003 | Shirai et al. |
| 9,664,787 | B2 | 5/2017 | Kim |
| 10,055,650 | B2 | 8/2018 | Yi et al. |
| 2010/0250064 | A1 | 9/2010 | Ota et al. |
| 2012/0185167 | A1 | 7/2012 | Higuchi et al. |
| 2015/0002284 | A1* | 1/2015 | Matsuno .................. B60Q 9/00 340/435 |
| 2015/0199577 | A1* | 7/2015 | Kim ...................... G01S 17/931 348/148 |
| 2018/0178785 | A1* | 6/2018 | Lin ........................ G06V 20/588 |
| 2021/0241467 | A1* | 8/2021 | Lee ........................ G01S 17/08 |

FOREIGN PATENT DOCUMENTS

| | | |
|---|---|---|
| KR | 1020140071174 | 6/2014 |
| KR | 1020140122810 | 10/2014 |
| KR | 1020150074750 | 7/2015 |

OTHER PUBLICATIONS

Nikolaos Gkikas et al., "Ergonomics Issues with Advanced Driver Assistance Systems (ADAS): Driver-Vehicle Interaction", XP055691283, Sep. 25, 2012, 22 pages.
NAP: The National Academies Press, "Real-Time Traveler Information Systems", XP055691393, Jul. 14, 2009, 65 pages.
Juergen Ludwig: "Development IT and Navigation:Electronic Horizon-Forward-Looking Safety Systems and Their Connection to Navigation Units", XP008177580, Jan. 1, 2012, 6 pgs.
Jacques Ehrlich: "Foreword; Intelligent Transportation Systems", vol. 60, No. 3-4, XP019968358, Apr. 1, 2005, 3 pages.
European Search Report dated May 19, 2020 issued in counterpart application No. 18747756.7-1207, 14 pages.
Alexey Abramov et al., "Multi-Lane Perception Using Feature Fusion Based on GraphSLAM", XP033011831, Oct. 9-14, 2016, 8 pages.
Urban Meis et al., "A New Method for Robust Far-distance Road Course Estimation in Advanced Driver Assistance Systems", XP031792765, Sep. 19-22, 2010, 6 pages.
European Search Report dated Feb. 6, 2020 issued in counterpart application No. 18747756.7-1207, 9 pages.
International Search Report dated May 16, 2018 issued in counterpart application No. PCT/KR2018/000902, 28 pages.

* cited by examiner

METHOD AND DEVICE FOR OUTPUTTING LANE INFORMATION

PRIORITY

This application is a National Phase Entry of PCT International Application No. PCT/KR2018/000902 which was filed on Jan. 19, 2018, and claims priority to Korean Patent Application No. 10-2017-0015688, which was filed on Feb. 3, 2017, the content of each of which is incorporated herein by reference.

TECHNICAL FIELD

The present disclosure relates to a method and device for outputting lane information.

BACKGROUND ART

As technologies applied to vehicles have evolved, various methods for displaying information related to the operation of a vehicle on a window of the vehicle or the like have been developed.

Depending, on the weather in an area where a vehicle is operated, such as heavy rain, heavy fog, or at night, or the time when the vehicle is operated, a driver may not have enough visibility to operate the vehicle. Accordingly, there is an increasing demand for a technique that provides the driver with information necessary to drive the vehicle, for example, information about lanes where the vehicle is located or a lane bending direction at a long front distance.

DESCRIPTION OF EMBODIMENTS

Technical Problem

Provided are a method and device for outputting lane information. Also, provided is a computer readable recording medium including a program, which when executed by a computer, performs the method described above. The technical problem to be solved is not limited to technical problems as described above, and other technical problems may exist.

BEST MODE

According to an aspect, a vehicle driving assistance device includes: a sensing unit configured to capture a front image of a running vehicle; a processor configured to detect a lane by using the front image and estimate the lane by detecting objects around a road, on which the vehicle is running, by using the sensing unit; and an output unit configured to output the estimated lane.

According to another aspect, a method of outputting lane information includes: detecting a lane by using a sensing unit included in a vehicle; estimating a lane by detecting objects around a road, on which the vehicle is running, by using the sensing unit; and outputting the detected lane to a display device.

According to another aspect, a computer readable recording medium including a program, which when executed by a computer, performs the method described above.

Mode of Disclosure

The terms used in the present disclosure are selected from among common terms that are currently widely used in consideration of their function in the present disclosure. However, the terms may be different according to an intention of one of ordinary skill in the art, a precedent, or the advent of new technology. In addition, in particular cases, the terms are discretionally selected by the applicant, and the meaning of those terms will be described in detail in the corresponding part of the detailed description. Thus, the terms used in the present disclosure are not merely designations of the terms, but the terms are defined based on the meaning of the terms and content throughout the present disclosure.

Throughout the present specification, when a part "includes" an element, it is to be understood that the part additionally includes other elements rather than excluding other elements as long as there is no particular opposing recitation. In addition, the terms such as " . . . unit", "module", or the like used in the present specification indicate a unit which processes at least one function or motion, and the unit may be implemented as hardware or software or by a combination of hardware and software.

Embodiments will now be described more fully with reference to the accompanying drawings so that those of ordinary skill in the art may practice the embodiments without any difficulty. However, the present embodiments may have different forms and should not be construed as being limited to the descriptions set forth herein.

Hereinafter, embodiments will be described in detail with reference to the drawings.

Figure 1:
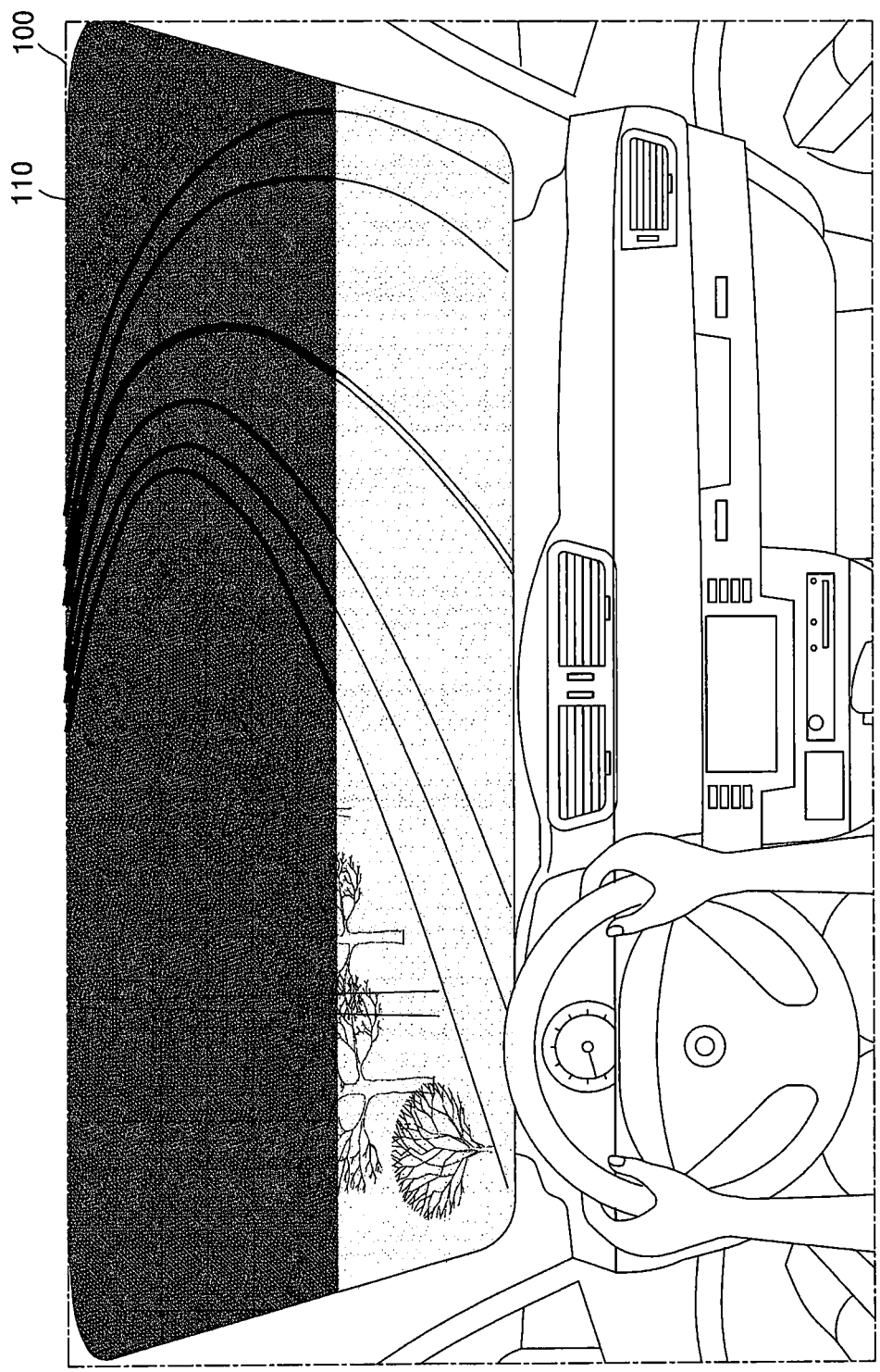
FIG. 1 is a view illustrating an example in which lane information is displayed, according to an embodiment.

FIG. 1 is a view illustrating an example in which lane information is displayed, according to an embodiment.

FIG. 1 shows an example in which a guide image 110 is output to a vehicle 100 which is running. In this case, the guide image 110 includes information for guiding the driving of the vehicle 100. For example, the guide image 110 may include information about the state (e.g., lane curvature and slope) of a road on which the vehicle 100 is running, and information about an environment (e.g., weather, time, and surrounding objects) around the vehicle 100.

When a driver drives the vehicle 100 in bad weather or at night, the driver's view may not be sufficiently secured. For example, when the driver drives the vehicle 100 along a curved road in cloudy weather, the driver may not have enough information about where the road is curved or the degree of curvature of the road in a certain direction. Accordingly, the risk of accidents may increase and a driver's fatigue may increase.

As the vehicle 100 outputs the guide image 110, the driver may safely drive the vehicle 100 even when the driving environment is poor. In addition, various pieces of information necessary for the driver to operate the vehicle 100 is included in the guide image 110, and thus, the driver's driving satisfaction may be enhanced.

A vehicle driving assistance device may generate the guide image 110 by using a sensing unit. The sensing unit may include an image sensor, a lidar module, a radar module, and the like. The image sensor may include a camera, which may include, but is not limited to, a mono camera, a stereo camera, an infrared camera, an ultrasonic camera, or a thermal imaging camera. For example, a processor in the vehicle driving assistance device may control the sensing unit and generate the guide image 110 by performing data processing. In addition, the vehicle driving assistance device may include a memory for storing data required for the operation of the processor and a guide image, and a communication unit capable of communicating with an external device.

The guide image 110 may include the locations and types of a car, a pedestrian, a cyclist, a road surface mark, a signboard, a lane, and the like around the vehicle 100, driving information such as the speed of the vehicle 100, and environment information such as the weather, temperature, and the like. The guide image 110 may be output as an image through an output unit of the vehicle 100. In addition, information included in the guide image 110 may be output through the output unit of the vehicle 100 as sound. For example, the processor may output the guide image 110 to at least one of a head-up display, a central information display (CID), and a cluster included in the vehicle 100. Also, the processor may output the guide image 110 or content (moving picture, music, text, etc.) to an external device connected through the communication unit.

Hereinafter, examples in which the processor included in the vehicle 100 generates the guide image 110 and outputs the guide image 110 are described with reference to FIGS. 2 to 19.

Figure 2:
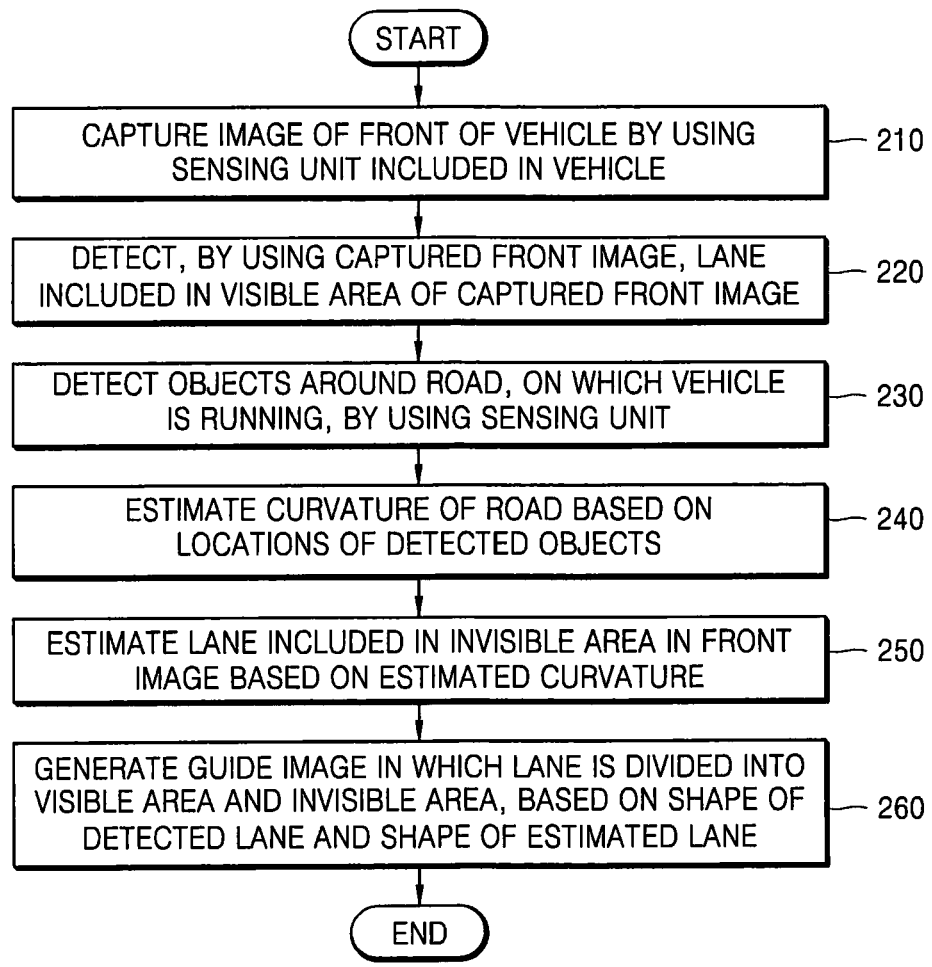
FIG. 2 is a flowchart illustrating an example of a method of outputting a guide image, according to an embodiment.

FIG. 2 is a flowchart illustrating an example of a method of generating a guide image, according to an embodiment.

In operation 210, a processor captures an image of the front of a vehicle by using a sensing unit included in the vehicle. For example, an image sensor of the sensing unit may include a camera, and the camera may include, but is not limited to, a mono camera, a stereo camera, an infrared camera, an ultrasonic camera, or a thermal imaging camera.

In operation 220, the processor detects, by using a captured front image, a lane included in a visible area of the captured front image. For example, the processor may detect a lane of a road, on which the vehicle is running, by segmenting the lane included in the front image. Then, the processor may distinguish the visible area from an invisible area in the front image based on the result of detecting the lane. The processor may also identify an endpoint of a lane in the visible area of the front image and obtain the distance from the vehicle to the endpoint of the lane. An example in which the processor detects the lane and obtains the distance from the vehicle to the endpoint of the lane is described with reference to FIGS. 3 to 5.

Figure 3:
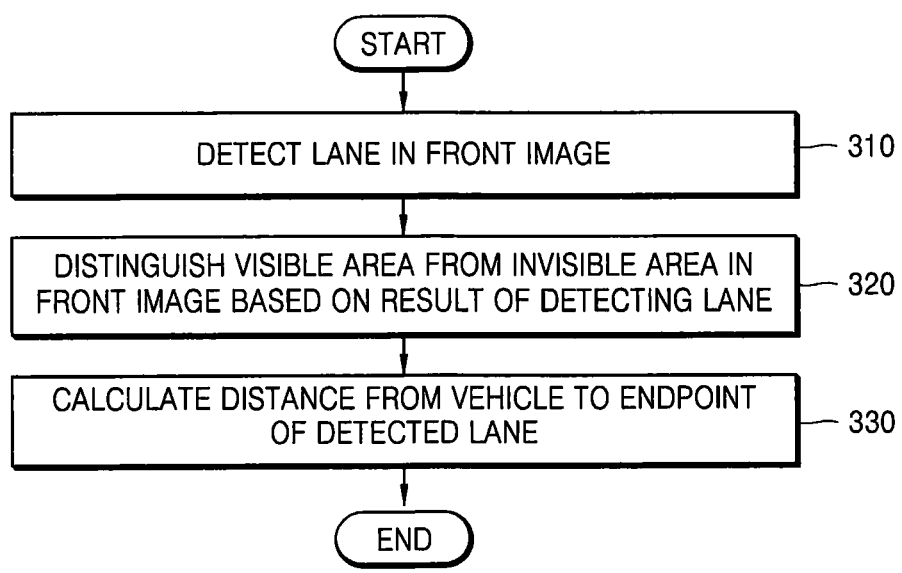
FIG. 3 is a flowchart illustrating an example in which a processor detects a lane and obtains a distance from a vehicle to the lane.

FIG. 3 is a flowchart illustrating an example in which a processor detects a lane and obtains the distance from a vehicle to the lane.

In operation 310, the processor detects a lane in a front image. The front image is an image captured through a camera of the vehicle and refers to an image of a road on which the vehicle is running For example, the processor may segment the lane in the front image by configuring a graph of the front image and applying a graph cut algorithm to the configured graph. The graph cut algorithm refers to an algorithm for classifying pixels included in an image into pixels corresponding to an object (e.g., a lane) and pixels not corresponding to the object by cutting the graph by using a threshold value. However, it is only one example that the processor uses the graph cut algorithm to segment an object, and the processor may segment the lane in the front image by using various other image segmentation methods.

In addition, the processor may detect the lane in the front image by using a hand-crafted feature-based or deep learning-based object detection algorithm.

In operation 320, the processor distinguishes a visible area from an invisible area in the front image based on the result of detecting the lane. In this case, the visible area refers to an area where an object represented in an image may be identified, and the invisible area refers to an area where an object represented in an image is difficult to be identified. The object refers to a person, animal, plant or thing located around a road on which the vehicle is running. For example, examples of the object may include not only persons, animals, plants, but also traffic lights, traffic signs, medians, sound barriers, street lights, poles or other vehicles.

For example, the processor may determine, as a visible area, an area where a lane is detected in a front image and may determine, as an invisible area, an area other than the visible area.

The visible area and the invisible area are described with reference to FIG. 4.

Figure 4:
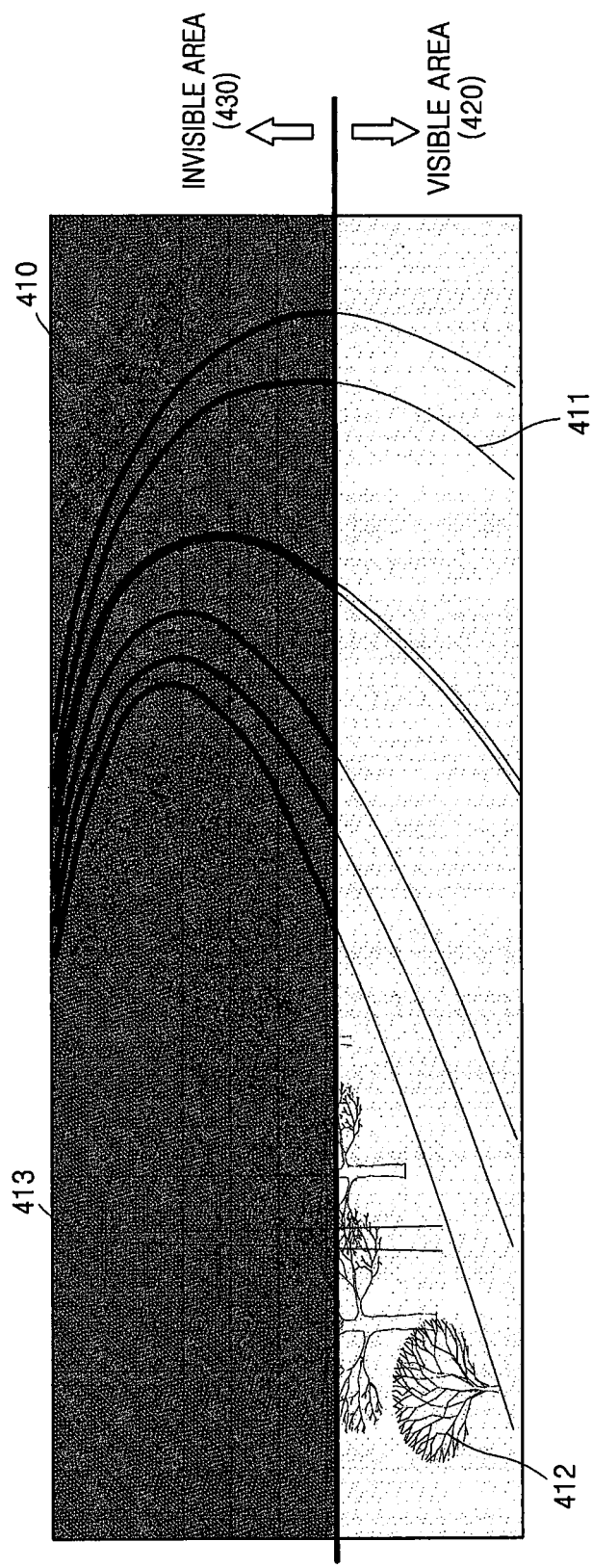
FIG. 4 is a view for explaining an example of a visible area and an invisible area, according to an embodiment.

FIG. 4 is a view for explaining an example of a visible area and an invisible area according to an embodiment.

FIG. 4 shows an example of a front image 410 captured using a camera. A road 411 on which a vehicle is running and objects 412 and 413 around the road are shown in the front image 410. It is assumed that the front image 410 is captured in such a situation that the front view of a driver is difficult to be secured due to fog or the like.

Referring to the front image 410, only a part of the road 411 may be identified. In other words, depending on the situation (e.g., foggy weather) in which the front image 410 is captured, a road 411 in an area 420 adjacent to the vehicle in the front image 410 is identifiable, but a road 411 in an area 430 remote from the vehicle in the front image 410 is difficult to identify. Thus, information such as a direction in which the road 411 in the area 430 advances or a curvature of the road 411 in the area 430 may not be determined based on the front image 410.

Hereinafter, an area where the road 411 is identifiable in the front image 410 is referred to as a visible area 420, and an area where the road 411 is hardly identified in the front image 410 is referred to as an invisible area 430. The processor may determine, as the visible area 420, an area where the road 411 may be detected in the front image 410 and determine, as the invisible area 430, an area where the road 411 may not be detected. For example, the processor may detect the road 411 in the front image 410 by using the graph cut algorithm, the hand-crafted feature-based or deep learning-based object detection algorithm, or the like and may determine, as an invisible area, an area where it is difficult to detect the road 411 in the front image 410.

In FIG. 4, the reference for distinguishing the visible area 420 from the invisible area 430 is the road 411. However, the front image 410 may be divided into the visible area 420 and the invisible area 430 depending on whether at least one of the other objects 412 and 413 shown in the front image 410 is identifiable.

Referring back to FIG. 3, in operation 330, the processor calculates the distance from the vehicle to an endpoint of a detected lane. In other words, the processor may calculate the distance from the vehicle to an endpoint of a lane included in the visible area.

Assuming that a front area of the vehicle is flat, the processor may calculate the distance from the vehicle to a predetermined point based on the longitudinal resolution of the front image. For example, it may be understood that the lane is displayed on the surface of a road and there is no lane height based on the surface of the road. Thus, when an endpoint of a lane is identified in the front image, the processor may calculate the distance from a camera that has captured the front image to the identified endpoint. In the case of an object having a height, the processor may calculate the distance from the camera to the object with respect to the bottom surface of the object. In general, an object at an upper end of an image is at a greater distance from the camera than an object at a lower end of an image. Information about an actual distance corresponding to one pixel of the image may be previously stored. In addition, information about a location where the camera is embedded in the vehicle may also be previously stored. Thus, the processor may calculate the distance from the camera to the endpoint of the lane based on where the endpoint of the lane is located in the image. The processor may also calculate the distance from the vehicle to the endpoint of the lane based on the distance from the camera to the endpoint of the lane.

The method of calculating the distance from the vehicle to the endpoint of the lane may vary depending on the type of camera included in the vehicle. As an example, when the camera is a mono camera, an example in which the processor calculates the distance from the vehicle to the endpoint of the lane is described below with reference to FIG. 5. As another example, when the camera is a stereo camera, an example in which the processor calculates the distance from the vehicle to the endpoint of the lane is described below with reference to FIG. 6. As another example, when the camera is an infrared camera or a thermal imaging camera, the processor may calculate the distance from the vehicle to the endpoint of the lane by using a time of arrival (TOA) of an infrared signal emitted from the camera. In other words, the processor may calculate the distance from the vehicle to the endpoint of the lane by using a time, during which the infrared signal is reflected from the lane and then returns to the camera, and the speed of the infrared signal.

Figure 5:
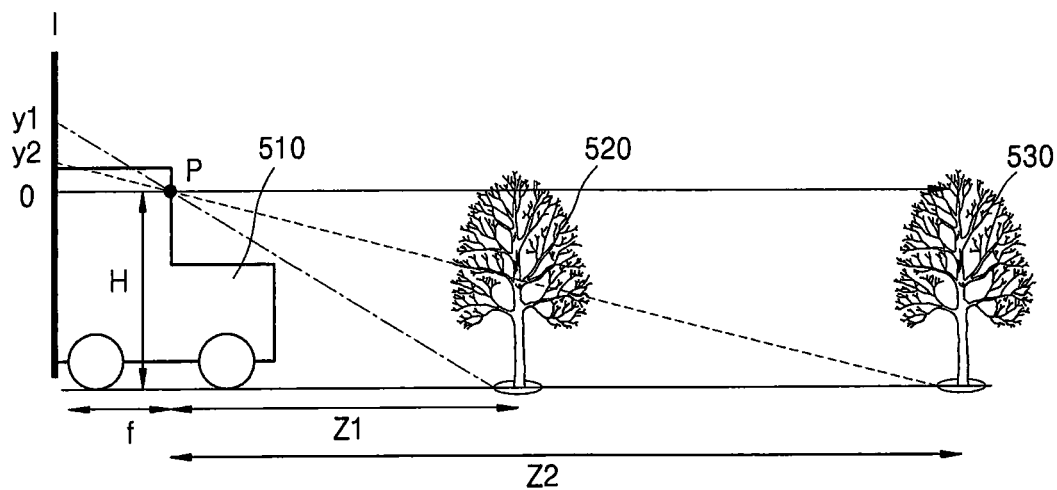
FIG. 5 is a view for explaining an example in which a processor calculates a distance from a vehicle to an endpoint of a lane in the case where a camera is a mono camera, according to an embodiment.

FIG. 5 is a view for explaining an example in which a processor calculates the distance from a vehicle to an endpoint of a lane in the case where the camera is a mono camera, according to an embodiment.

When a mono camera P is included in a vehicle 510, the processor may calculate the distances from the mono camera P to objects 520 and 530. In this case, information about a location where the mono camera P is embedded in the vehicle 510 may be previously stored. Thus, the processor may calculate the distances from the vehicle 510 to the objects 520 and 530. In FIG. 5, the objects 520 and 530 are shown as trees for convenience of explanation. However, the objects 520 and 530 may correspond to endpoints of lanes in addition to the trees.

For example, the processor may calculate the distances from the vehicle 510 to the objects 520 and 530 based on Equation 1 below.

$$\frac{y}{f} = \frac{H}{Z}$$
$$\therefore Z = \frac{fH}{y}$$
⟨Equation 1⟩

In Equation 1, y denotes a height in an image I. f denotes a focal length of a lens of the mono camera P and H denotes a height from the ground to the mono camera P. Z denotes a distance from the mono camera P to the object 520 or 530.

Among the variables in Equation 1, f and H may be preset. Thus, the processor may find a position y of the lower surface (a portion that meets the ground) of the object 520 or 530 in the image I and calculate a distance Z from the position y to the object 520 or 530 based on Equation 1.

Figure 6:
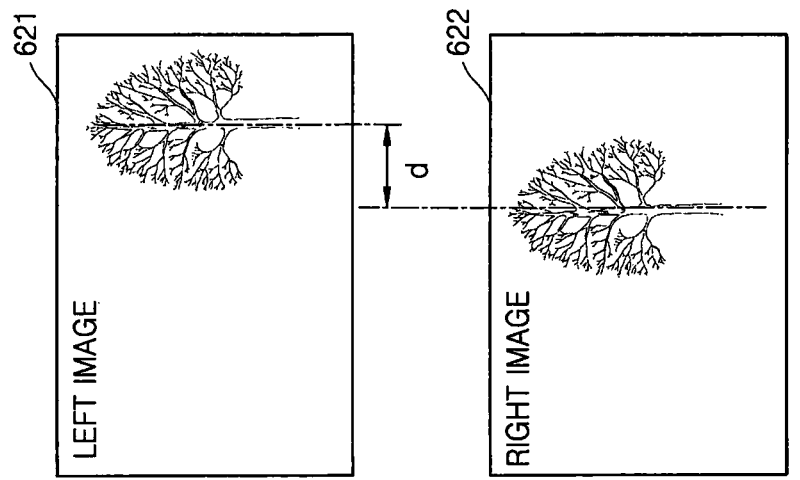
FIG. 6 is a view for explaining an example in which a processor calculates a distance from a vehicle to an endpoint of a lane in the case where a camera is a stereo camera, according to an embodiment.
Figure 6:
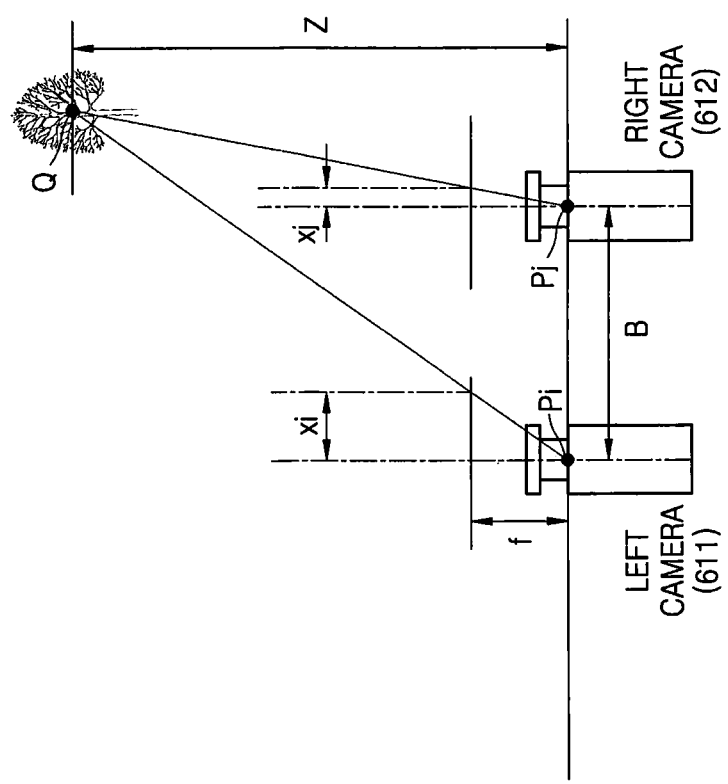

FIG. 6 is a view for explaining an example in which the processor calculates the distance from a vehicle to an endpoint of a lane in the case where the camera is a stereo camera, according to an embodiment.

When the vehicle includes stereo cameras 611 and 612, the processor may calculate the distances from the stereo cameras 611 and 612 to an object Q. In this case, information about a location where the stereo cameras 611 and 612 are embedded in the vehicle may be previously stored. Thus, the processor may calculate the distance from the vehicle to the object Q. In FIG. 6, the object Q is shown as a tree for convenience of explanation. However, the object Q may correspond to an endpoint of a lane in addition to the tree.

The stereo cameras 611 and 612 in FIG. 6 include a left camera 611 and a right camera 612. An image generated by the left camera 611 is referred to as a left image 621, and an image generated by the right camera 612 is referred to as a right image 622.

For example, the processor may calculate the distance from the vehicle to the object Q based on Equation 2 below.

$$Z = (B \times f)/d'  \quad \text{<Equation 2>}$$

where $d = x_i - x_j$

In Equation 2, Z denotes a distance between the stereo camera 611 or 612 and the object Q, and B denotes a distance between the left camera 611 and the right camera 612. F denotes a focal length of a lens of the stereo camera 611 or 612 and d denotes a time difference between the left image 621 and the right image 622.

Among the variables in Equation 2, f and B may be preset. Thus, the processor may calculate the distance Z from the vehicle to the object Q based on the time difference d between the left image 621 and the right image 622.

Referring again to FIG. 2, in operation 230, the processor detects objects around the road, on which the vehicle is running, by using the sensing unit. For example, a radar/lidar module may receive a signal (hereinafter referred to as a 'reflected signal') that is returned from an object, and the processor may analyze the reflected signal to determine the location of the object and the type of object. For example, an antenna of the radar/lidar module may have a multi-array structure or a parabolic structure, but is not limited thereto.

The processor may analyze the reflected signal to determine whether the object is moving or is at rest. In addition, if the object is moving, the processor may detect the motion of the object to predict the course of the object. For example, the radar/lidar module may emit radial signals having a narrow included angle (e.g., 2 degrees or less), and the processor may estimate the type, location, moving speed, and/or moving direction of the object based on the distance, reflectivity, direction angle, and Doppler frequency of the reflected signal corresponding to the radial signals. For example, the processor may determine whether the object is a metallic object (e.g., automobile or streetlight) or a non-metallic object (e.g., animal or plant) based on the reflectivity of the reflected signal.

In this case, the object refers to a person, animal, plant or thing located around a road on which the vehicle is running. For example, examples of the object may include not only persons, animals, plants, but also traffic lights, traffic signs, median strips, poles or other vehicles.

In operation 240, the processor estimates the curvature of the road based on the locations of detected objects. In operation 250, the processor estimates a lane included in the invisible area in the front image based on the estimated curvature.

For example, the processor may estimate the curvature of the road based on the locations of detected objects. Since the lane is drawn along the curvature of the road, the processor may estimate the lane in the invisible area by using the curvature of the road in the invisible area and the width of the road.

In general, a roadside tree, a traffic light, a traffic sign, or the like may be located around the road. Thus, the processor may determine the curvature of the road by analyzing the locations of objects detected through the radar/lidar module. Furthermore, since the lane is drawn along the curvature of the road, the processor may estimate the lane based on the curvature of the road.

The radar/lidar module may receive a signal reflected from the object regardless of whether the object is in the visible area or the invisible area. Thus, even though the object is not identified in an image captured by the camera, the processor may detect the object by analyzing the signal received by the radar/lidar module. Accordingly, the processor may use the camera and the radar/lidar module to thereby detect objects around the road regardless of an environment in which the vehicle is running and estimate a road curvature and a lane based on the locations of the objects.

Hereinafter, with reference to FIGS. 7 to 9, an example in which the processor estimates the curvature of a road and a lane included in an invisible area is described.

Figure 7:
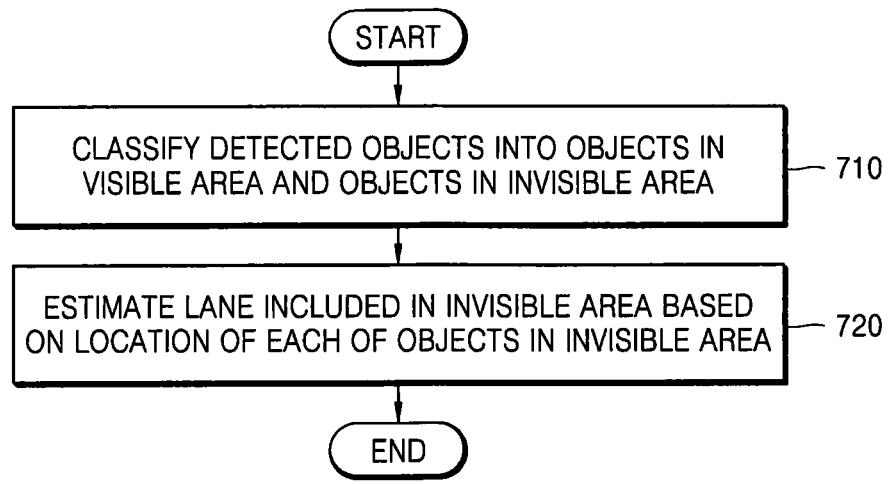
FIG. 7 is a flowchart illustrating an example in which a processor estimates a lane included in an invisible area, according to an embodiment.

FIG. 7 is a flowchart illustrating an example in which a processor estimates a lane included in an invisible area, according to an embodiment.

In operation 710, the processor classifies detected objects into objects in a visible area and objects in the invisible area. The processor may detect objects located in front of a vehicle by using a radar/lidar module. In addition, the processor may detect an object located in the visible area by using a front image captured by a camera. Thus, the processor may determine, as objects in the visible area, objects detected through the front image from among objects detected by using the radar/lidar module, and determine the other objects as objects in the invisible area.

Hereinafter, an example in which the processor distinguishes objects is described with reference to FIG. 8.

Figure 8:
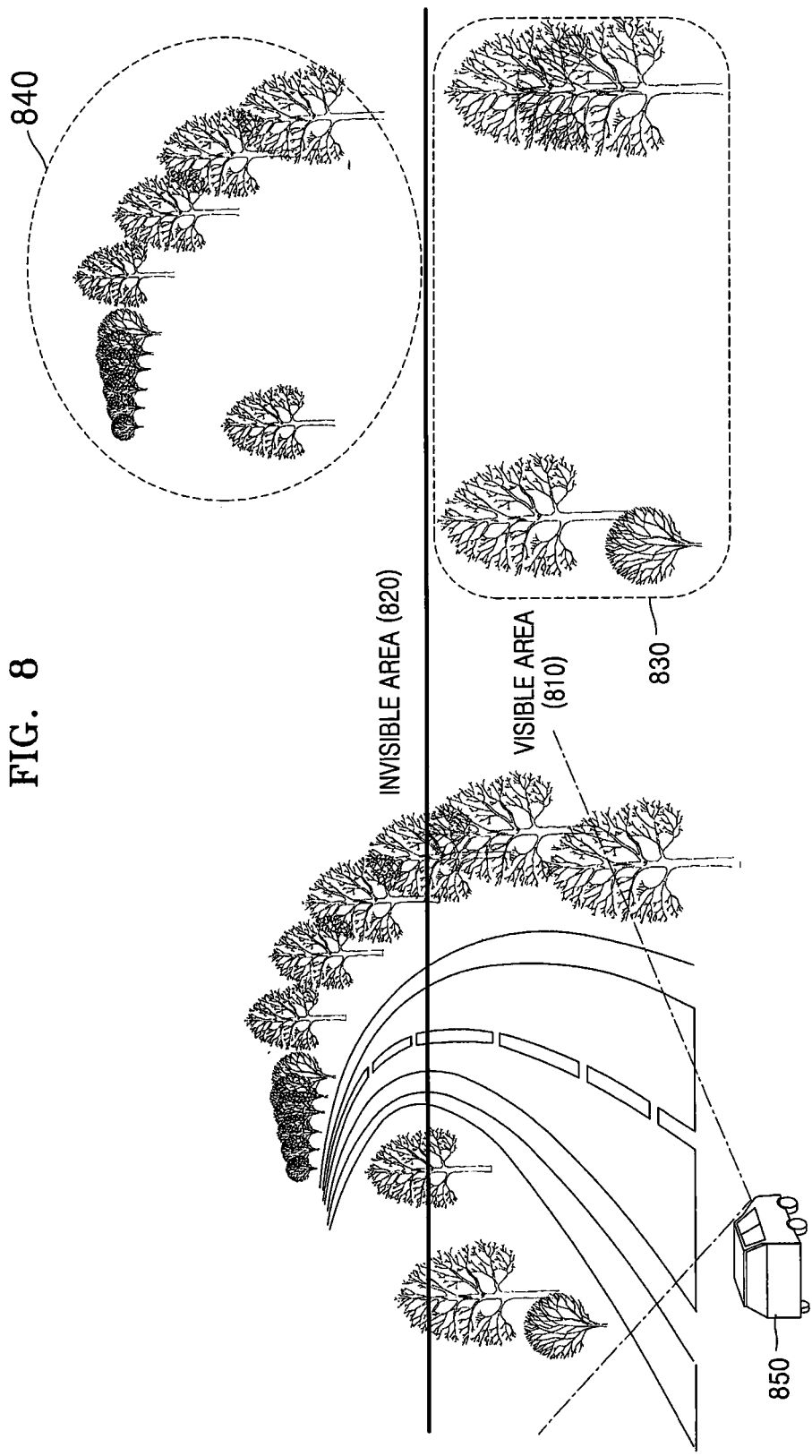
FIG. 8 is a view for explaining an example in which a processor distinguishes objects.

FIG. 8 is a view for explaining an example in which a processor distinguishes objects.

FIG. 8 shows an example in which objects 830 and 840 are located along the periphery of a road on which a vehicle 850 runs. A radar/lidar module of the vehicle 850 emits a signal toward the periphery of the vehicle 850 and receives a reflected signal corresponding to the emitted signal. The processor may analyze the reflected signal to detect the objects 830 and 840 located around the road.

The processor may distinguish a visible area 810 from an invisible area 820 by using a front image captured by a camera of the vehicle 850. For example, the processor may determine, as a visible area, an area where an object may be detected in the front image by using a graph cut algorithm, a hand-crafted feature-based or deep learning-based object detection algorithm, or the like, and may determine, as an invisible area, the remaining area (i.e., an area where an object may not be detected) other than the visible area. Thus, the processor may detect the objects 830 in the visible area 810 by using the front image captured by the camera.

The processor may select the objects 840 in the invisible area 820 by comparing the objects 830 and 840 detected by analyzing the reflected signal received by the radar/lidar module to objects (i.e., the objects 830 in the visible area 810) detected using the front image captured by the camera. For example, the processor may determine, as the objects 830 in the visible area 810, objects having the same shape by comparing the shapes of objects separated from an image to the shapes of objects obtained through an analysis of the reflected signal. The processor may determine, as the objects 840 in the invisible area 820, the remaining objects 840 other than the objects 830 in the visible area 810 from among the objects 830 and 840.

Referring again to FIG. 7, in operation 720, the processor estimates a lane included in the invisible area based on the location of each of the objects 840 in the invisible area.

Various objects may be around the road. For example, there may be streetlights, traffic signs, median strips, roadside trees, or traffic lights around the road. In general, the streetlights, the median strips, the roadside trees, etc. are arranged in parallel along the curvature of the road. Thus, the processor may estimate the curvature of a road in the invisible area and the width of the road by using location information of objects in the invisible area, for example, the streetlights, the median strips, and the roadside trees. In addition, since the lane is drawn along the curvature of the road, the processor may estimate the lane in the invisible area by using the curvature of the road in the invisible area and the width of the road.

Hereinafter, an example in which the processor estimates a lane included in the invisible area is described with reference to FIG. 9.

Figure 9:
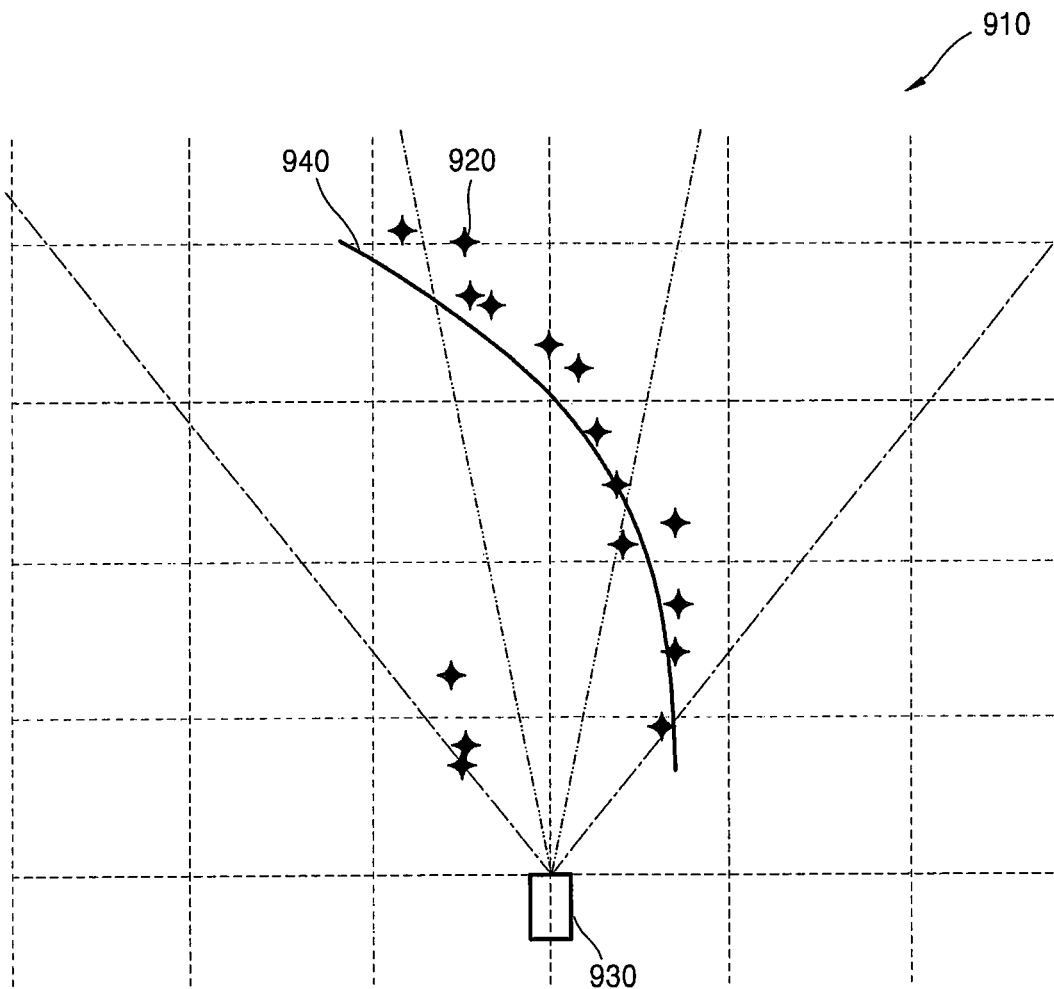
FIG. 9 is a view for explaining an example in which a processor estimates a lane included in an invisible area, according to an embodiment.

FIG. 9 is a view for explaining an example in which a processor estimates a lane included in an invisible area, according to an embodiment.

FIG. 9 shows a graph 910 showing the location of an object 920. The processor may calculate coordinates by using a direction angle and a distance to the object 920 and display the coordinates on the graph 910. The processor may also estimate a curvature 940 of a road by using the coordinates indicating the location of the object 920.

For example, the processor may estimate the curvature 940 of the road by accumulating data corresponding to each of reflected signals continuously received by a radar/lidar module and carrying out curve fitting using a piecewise linear algorithm or a spline algorithm. In addition, the processor may distinguish the left side of the road from the right side of the road by distinguishing reflected signals received from the left side of the road from reflected signals received from the right side of the road and may estimate the curvature 940.

Referring again to FIG. 2, in operation 260, the processor generates a guide image in which the lane is divided into a visible area and an invisible area, based on the shape of a detected lane and the shape of an estimated lane. In this case, the guide image includes information for guiding the driving of a vehicle. In other words, the guide image includes information necessary for the vehicle to run. For example, the guide image may include information about the state (e.g., lane curvature and slope) of a road on which the vehicle is running, and information about an environment (e.g., weather, time, and surrounding objects) around the vehicle.

In addition, the output unit included in the vehicle driving assistance device may display the guide image. Specifically, the processor sets the visible area in an image captured by the camera and detects a lane in the visible area. The processor estimates the curvature of a road included in the invisible area by using a reflected signal received by the radar/lidar module. The processor combines the curvature of a lane detected in the visible area with the curvature of a lane estimated in the invisible area to generate a guide image representing an estimated lane for the invisible area. The processor controls the output unit to output the guide image through the output unit.

Hereinafter, an example in which the processor generates a guide image is described with reference to FIGS. 10 and 11.

Figure 10:
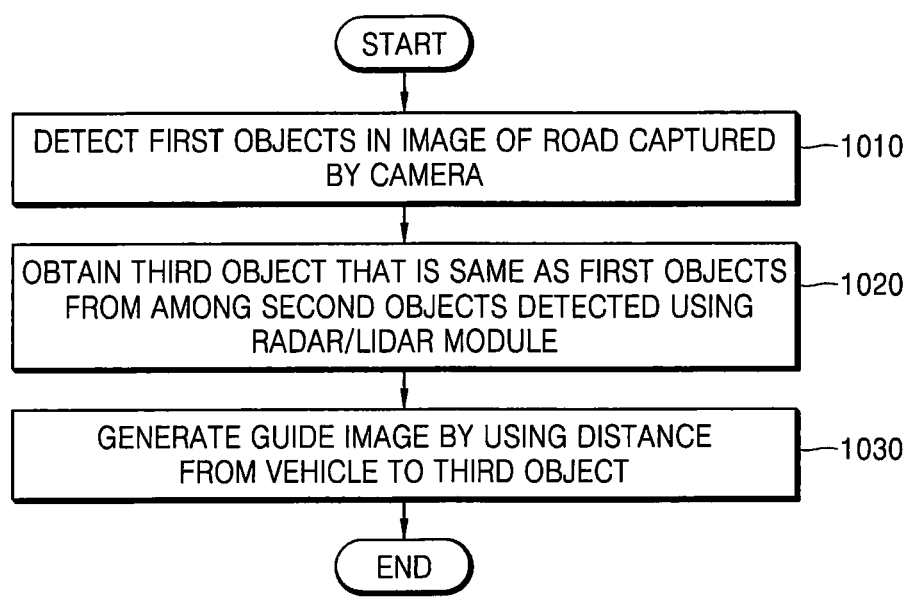
FIG. 10 is a flowchart illustrating an example in which a processor generates and outputs a guide image, according to an embodiment.

FIG. 10 is a flowchart illustrating an example in which a processor generates and outputs a guide image, according to an embodiment.

In operation 1010, the processor detects first objects in an image of a road captured by a camera.

For example, the processor may set a visible area in the image of the road and detect the first objects in the visible area. An example in which the processor sets the visible area in the image and detects the first objects is as described above with reference to FIGS. 3 to 6.

In operation 1020, the processor obtains a third object that is the same as the first objects from among second objects detected using a radar/lidar module.

For example, the processor may detect the second objects by using a reflected signal received by the radar/lidar module. The processor may classify the second objects into objects in the visible area and objects in the invisible area. An example in which the processor classifies the second objects into objects in the visible area and objects in the invisible area is as described above with reference to FIGS. 7 to 9. The processor may obtain a third object that is the same as the first objects from among the objects in the visible area.

In operation 1030, the processor generates a guide image by using the distance from the vehicle to the third object.

The third object may be detected by an image generated through the camera and may be detected also by a reflected signal received through the radar/lidar module. Thus, the third object may be used to match a lane of the visible area detected by the image to a lane of the invisible area estimated by the reflected signal. Hereinafter, an example in which the processor generates a guide image by using the distance from the vehicle to the third object is described with reference to FIG. 11.

Figure 11:
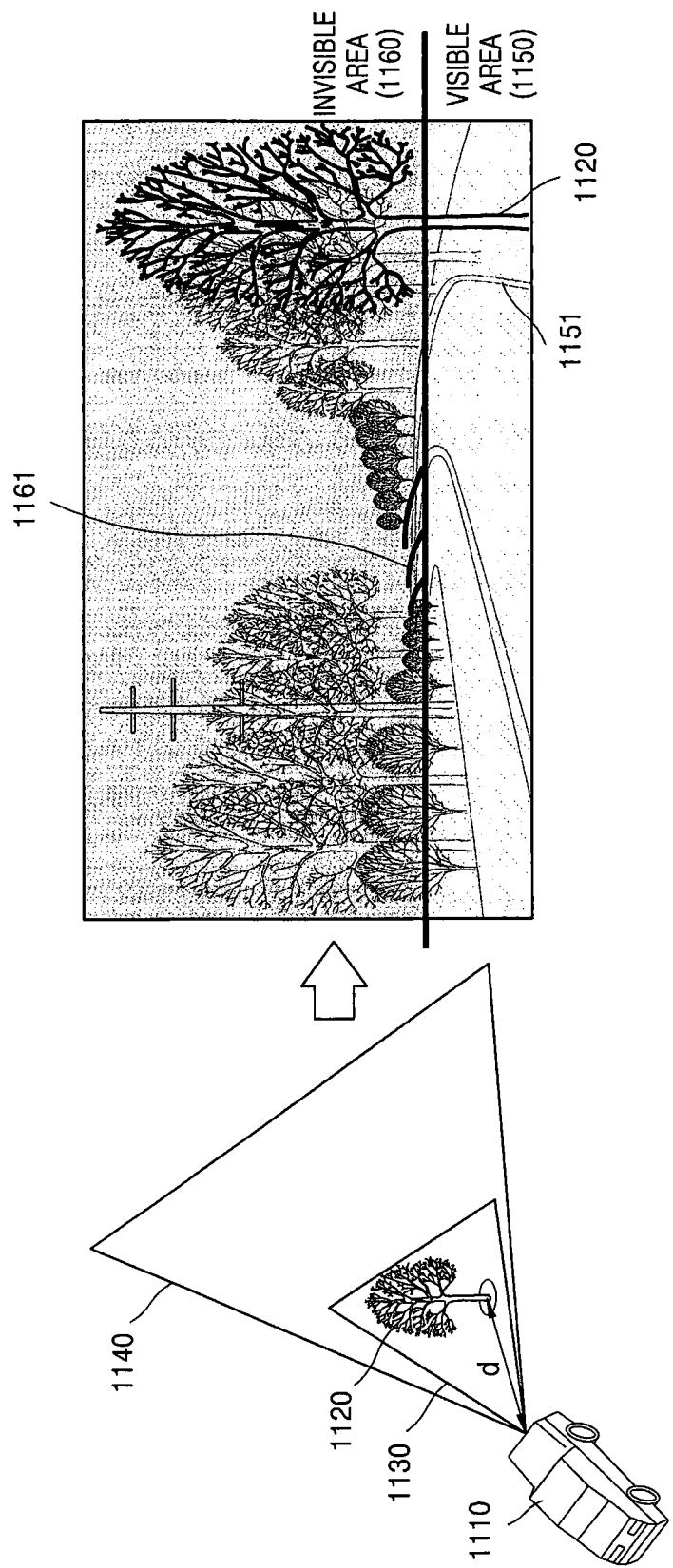
FIG. 11 is a view for explaining an example in which a processor generates a guide image, according to an embodiment.

FIG. 11 is a view for explaining an example in which a processor generates a guide image, according to an embodiment.

An area 1130 including a vehicle 1110 and a visible area 1150, and an area 1140 including the visible area 1150 and an invisible area 1160 are shown in FIG. 11. In addition, an object 1120 located in the visible area 1150 is shown in FIG. 11. The visible area 1150 is an area where an object is identifiable by an image captured by the camera and a reflected signal received by the radar/lidar module. Thus, the object 1120 may be identified by the image captured by the camera and may be identified also by the reflected signal received by the radar/lidar module.

The processor may generate a guide image by using a distance d from the vehicle 1110 to the object 1120. For example, the processor may identify the object 1120 and a lane 1151 in the image captured by the camera. In other words, the processor may detect the object 1120 and the lane 1151 included in the visible area 1150. The processor may calculate the distance d between the vehicle 1110 and the object 1120 by using the image and may also calculate a distance relation between objects included in the visible area 1150.

In addition, the processor may identify the object 1120 by using the reflected signal received by the radar/lidar module and may estimate a lane 1161 . In other words, the processor may detect the object 1120 included in the visible area 1150 and may estimate the lane 1161 in the invisible area 1160. The processor may calculate the distance d between the vehicle 1110 and the object 1120 by using the reflected signal and may also calculate a distance relation between objects included in the visible area 1150 and the invisible area.

Thus, the processor may map the lane 1151, which is a detected lane, to the lane 1161, which is an estimated lane, by using a distanced calculated using the image and a distance d calculated using the reflected signal. The processor may also calculate a distance relationship between nearby objects of the vehicle 1110 and thus may accurately map the lane 1161 to an area where the lane 1151 is not identified.

Although a case in which the processor maps the lane 1151 to the lane 1161 by using the distance from the vehicle to the third object in the visible area has been described above with reference to FIGS. 10 and 11, the present disclosure is not limited thereto. For example, the processor may map the lane 1151 to the lane 1161 by using the distance from the vehicle to an endpoint of a lane and the distance between each object around the vehicle and the vehicle.

Specifically, the processor may calculate the distance from the vehicle to an endpoint of a lane (i.e., an endpoint of a lane that may be detected in a front image) by using the front image. The processor may also use a reflected signal received by the radar/lidar module to calculate the curvature of a road and the distances between objects around the vehicle and the vehicle. The processor selects an object having the same distance as the distance from the vehicle to the endpoint of the lane. The processor may map the lane 1151 to the lane 1161 based on the selected object. In other words, the processor may generate a guide image for an area from the vehicle to the location of the object by using information about the lane 1151 and generate a guide image for an area farther than the location of the object by using information about the lane 1161.

The output unit may output the guide images. For example, the output unit may include at least one of a head-up display, a mirror display and a central information display included in the vehicle. Hereinafter, examples in which the processor outputs a guide image are described with reference to FIGS. 12A to 12C.

Figure 12A:
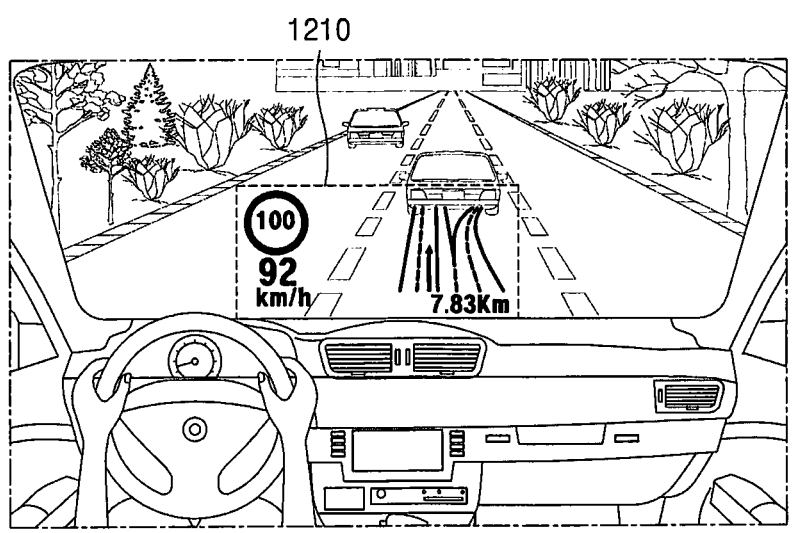
FIGS. 12A to 12C are views for explaining examples in which a guide image is output, according to an embodiment.
Figure 12B:
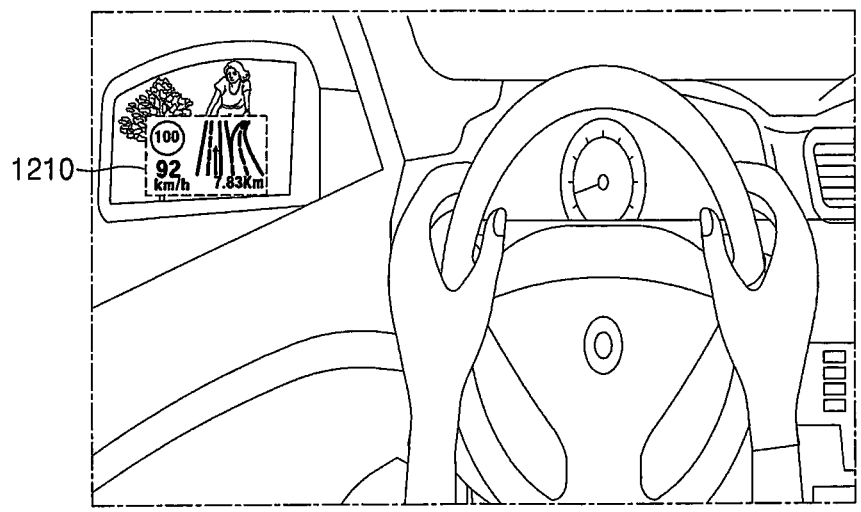
Figure 12C:
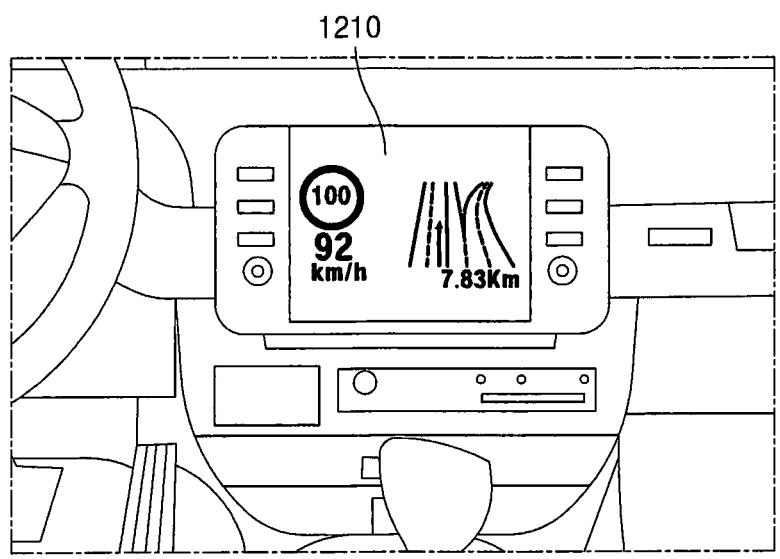

FIGS. 12A to 12C are views for explaining examples in which an image is output, according to an embodiment.

Referring to FIGS. 12A and 12C, a processor may display a guide image 1210 on a vehicle. As an example, the processor may display the guide image 1210 on a window of the vehicle through a head-up display device. As another example, the processor may display the guide image 1210 on a side mirror of the vehicle through a mirror display device. As another example, the processor may display the guide image 1210 on a screen of a central information display device of the vehicle.

The guide image generated by the processor may be variously implemented. For example, the guide image may be a combined image of a detected lane of a visible area and an estimated lane of an invisible area. As another example, the guide image may be an alarm image corresponding to a risk determined based on the state of the vehicle and an environment around the vehicle. As another example, the guide image may be an image representing the speed of the vehicle, a direction in which the vehicle runs, and an object located around the vehicle. Hereinafter, examples of the guide image are described with reference to FIGS. 13 to 18.

Figure 13:
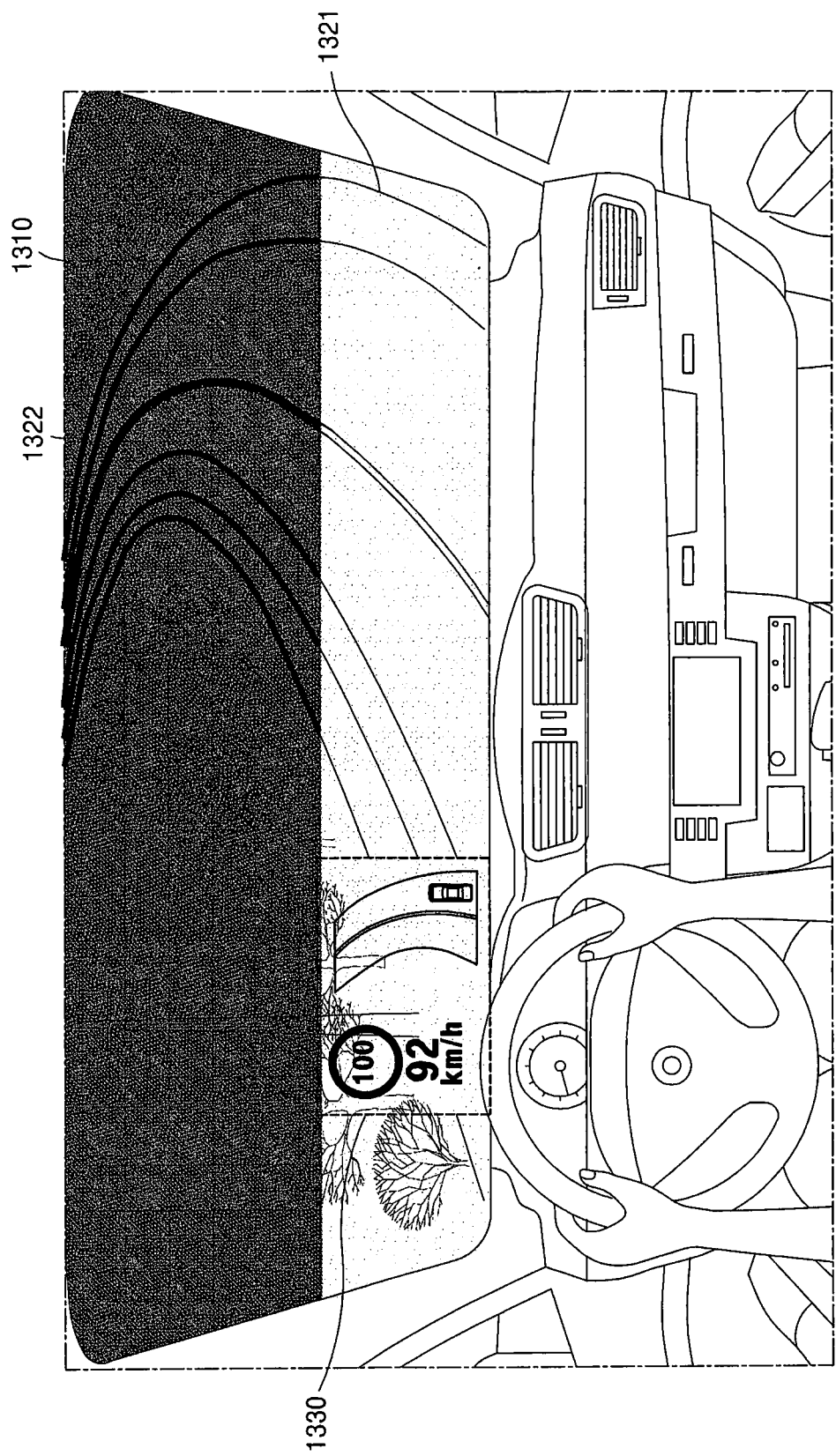
FIG. 13 is a view for explaining an example of a guide image according to an embodiment.

FIG. 13 is a view for explaining an example of a guide image according to an embodiment.

FIG. 13 shows a guide image 1310 output to a window of a vehicle. The guide image 1310 may include not only a lane 1321 of a visible area but also a lane 1322 of an invisible area. In this case, the lane 1321 and the lane 1322 may be displayed separately from each other. As an example, the lane 1321 may be displayed in the same manner as a lane of an actual road, and the lane 1322 may be displayed with a line having a different shape, thickness and/or color from the lane 1321 so as to be distinguished from the lane 1321. As another example, a road surface including the lane 1321 and a road surface including the lane 1322 may be displayed in different colors, and the road surface including the lane 1322 may be displayed such that a gradation effect appears on the road surface including the lane 1322.

In addition, the guide image 1310 may include running information 1330 of the vehicle. For example, the running information 1330 may include information about the current speed of the vehicle and a speed limit of a road on which the vehicle is currently running. The running information 1330 may include navigation information indicating a running direction of the vehicle and a route to a destination.

Information about the lane 1321, information about the lane 1322, and the running information 1330 included in the guide image 1310 shown in FIG. 13 may be displayed as separate images.

Figure 14:
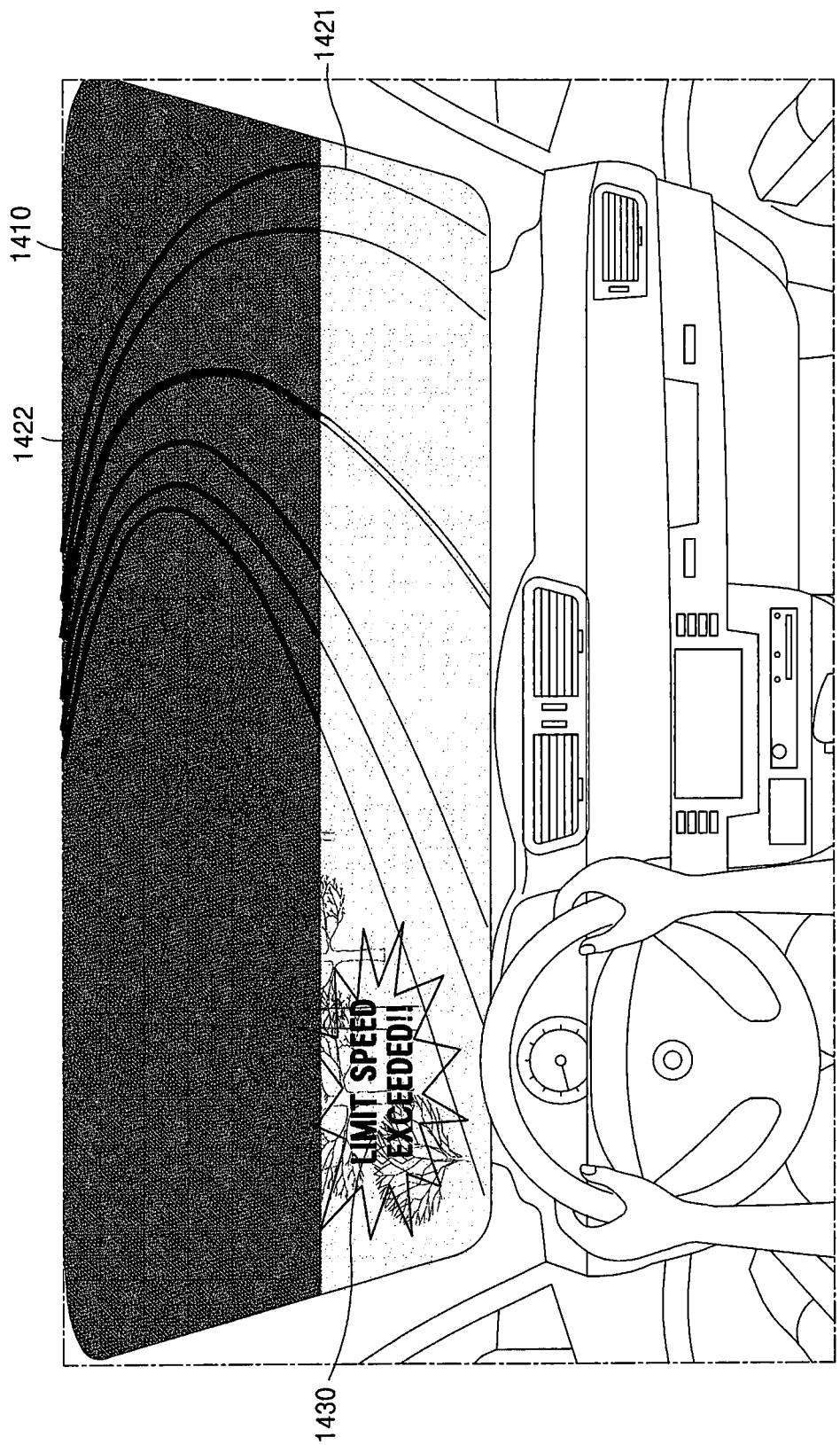
FIG. 14 is a view for explaining another example of a guide image according to an embodiment.

FIG. 14 is a view for explaining another example of a guide image according to an embodiment.

FIG. 14 shows a guide image 1410 output to a window of a vehicle. The guide image 1410 may include not only a lane 1421 of a visible area but also a lane 1422 of an invisible area. The lane 1421 and the lane 1422 may be displayed separately from each other as described above with reference to FIG. 13.

The guide image 1410 may include an alarm image 1430 corresponding to a risk determined based on the state of the vehicle and an environment around the vehicle. For example, assuming that a speed limit of a road on which the vehicle is running is 70 km/h, when the running speed of the vehicle exceeds 70 km/h, an alarm image 1430 informing a driver to reduce the speed may be displayed.

Although not shown in FIG. 14, an alarm sound may be output through a speaker of the vehicle when the running speed of the vehicle exceeds the limit speed. In addition, the processor may adjust a time interval at which the alarm sound is output according to the running speed of the vehicle.

Figure 15:
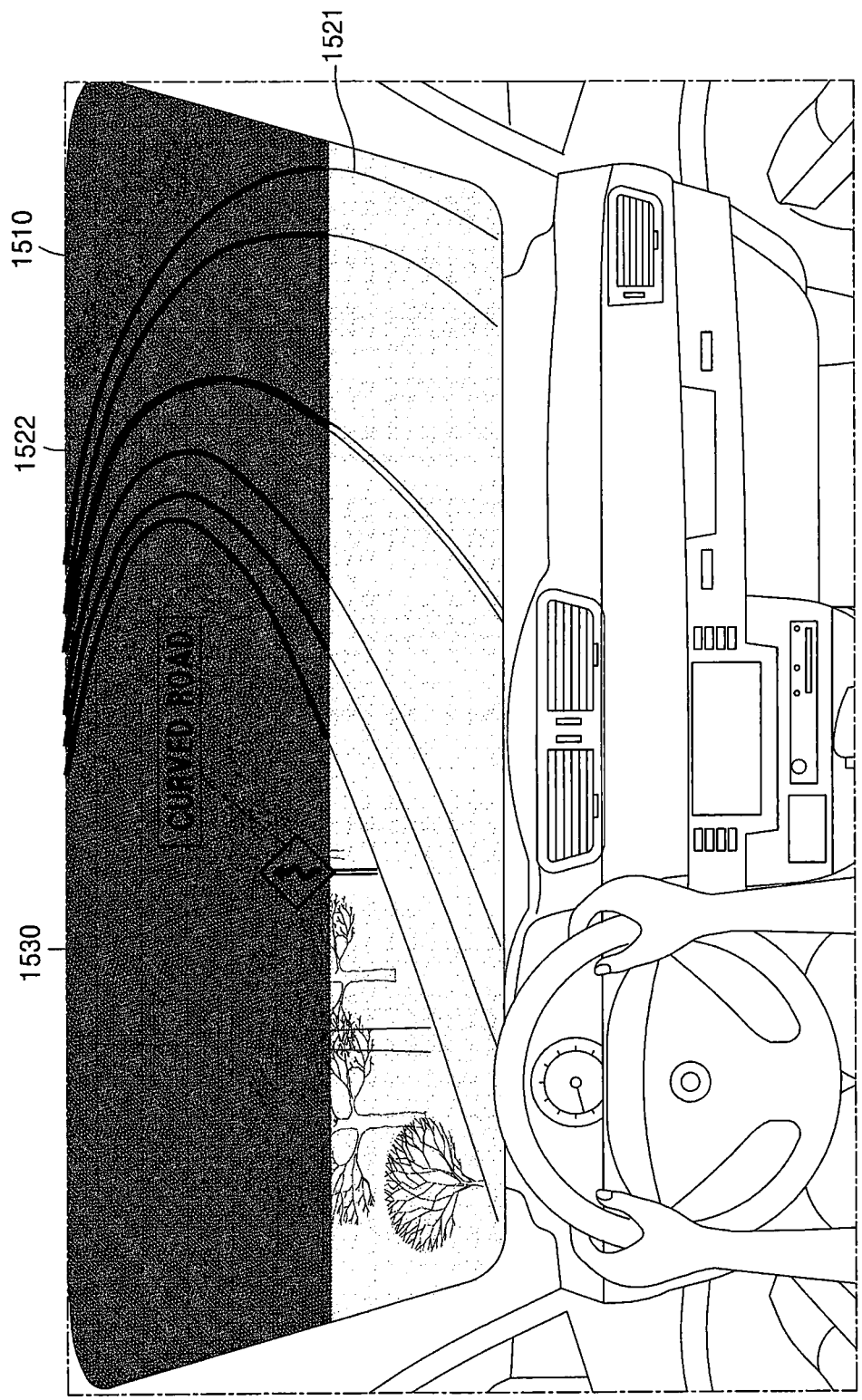
FIG. 15 is a view for explaining another example of a guide image according to an embodiment.

FIG. 15 is a view for explaining another example of a guide image according to an embodiment.

FIG. 15 shows a guide image 1510 output to a window of a vehicle. The guide image 1510 may include not only a lane 1521 of a visible area but also a lane 1522 of an invisible area. The lane 1521 and the lane 1522 may be displayed separately from each other as described above with reference to FIG. 13.

The guide image 1510 may include information about a traffic sign 1530 located around a road. For example, information obtained by mapping the shape of a traffic sign to the content of the traffic sign may be stored in a memory of the vehicle. When the traffic sign 1530 is identified while the vehicle is running, the processor may read the information stored in the memory and display the read information.

Figure 16:
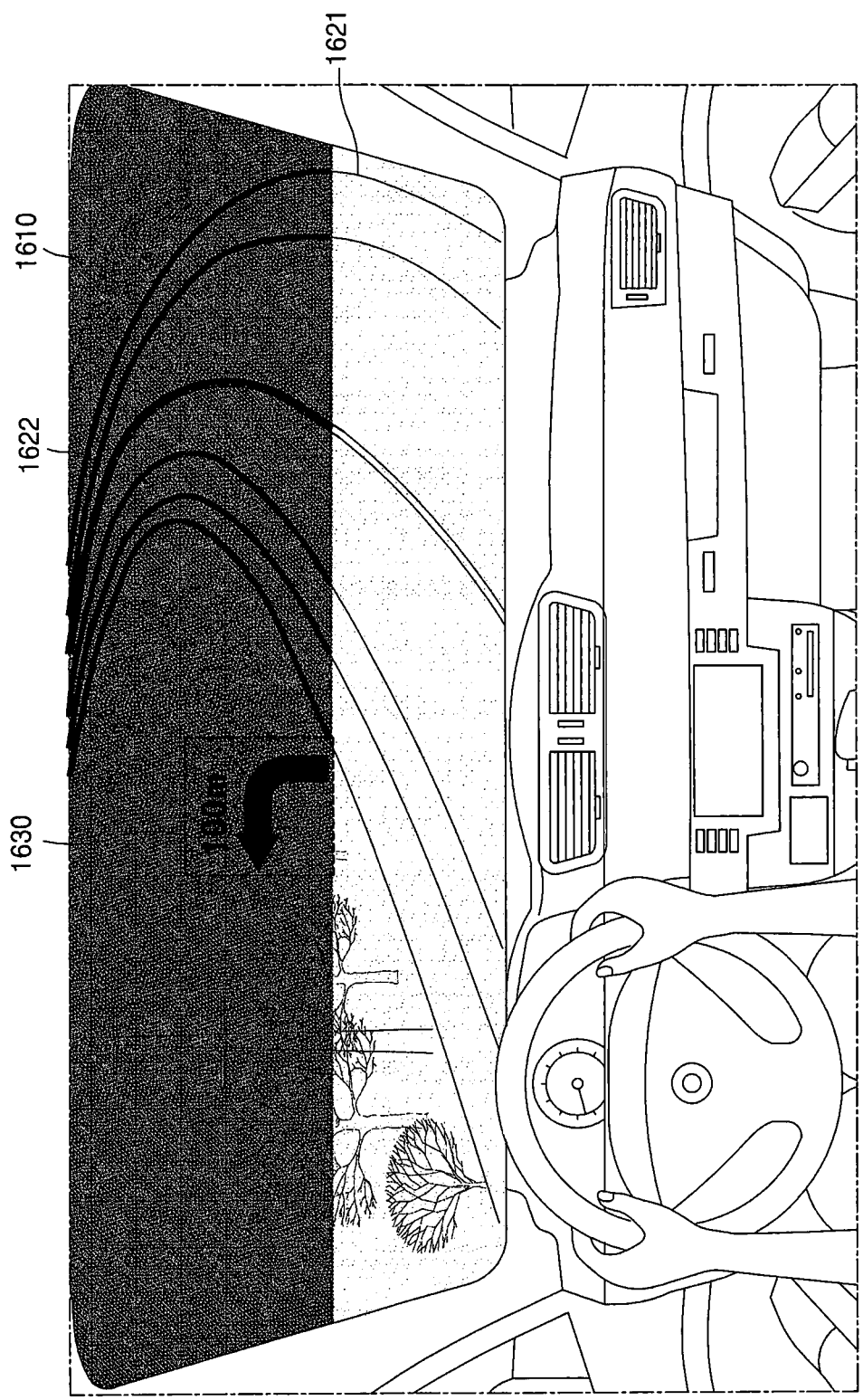
FIG. 16 is a view for explaining another example of a guide image according to an embodiment.

FIG. 16 is a view for explaining another example of a guide image according to an embodiment.

FIG. 16 shows a guide image 1610 output to a window of a vehicle. The guide image 1610 may include not only a lane 1621 of a visible area but also a lane 1622 of an invisible area. The lane 1621 and the lane 1622 may be displayed separately from each other as described above with reference to FIG. 13.

The guide image 1610 may include an indicator 1630 indicating a direction in which the vehicle has to run. For example, when the vehicle has to make a left turn 100 m ahead, the indicator 1630 may be displayed to inform the driver of this situation.

Although not shown in FIG. 16, when the vehicle changes its running direction (e.g., left turn, right turn, U-turn, or lane change), the processor may display, on a window of the vehicle, information indicating that the running direction has changed. In addition, the shape of the indicator 1630 may be displayed differently depending on the degree of bending of a front road.

Figure 17:
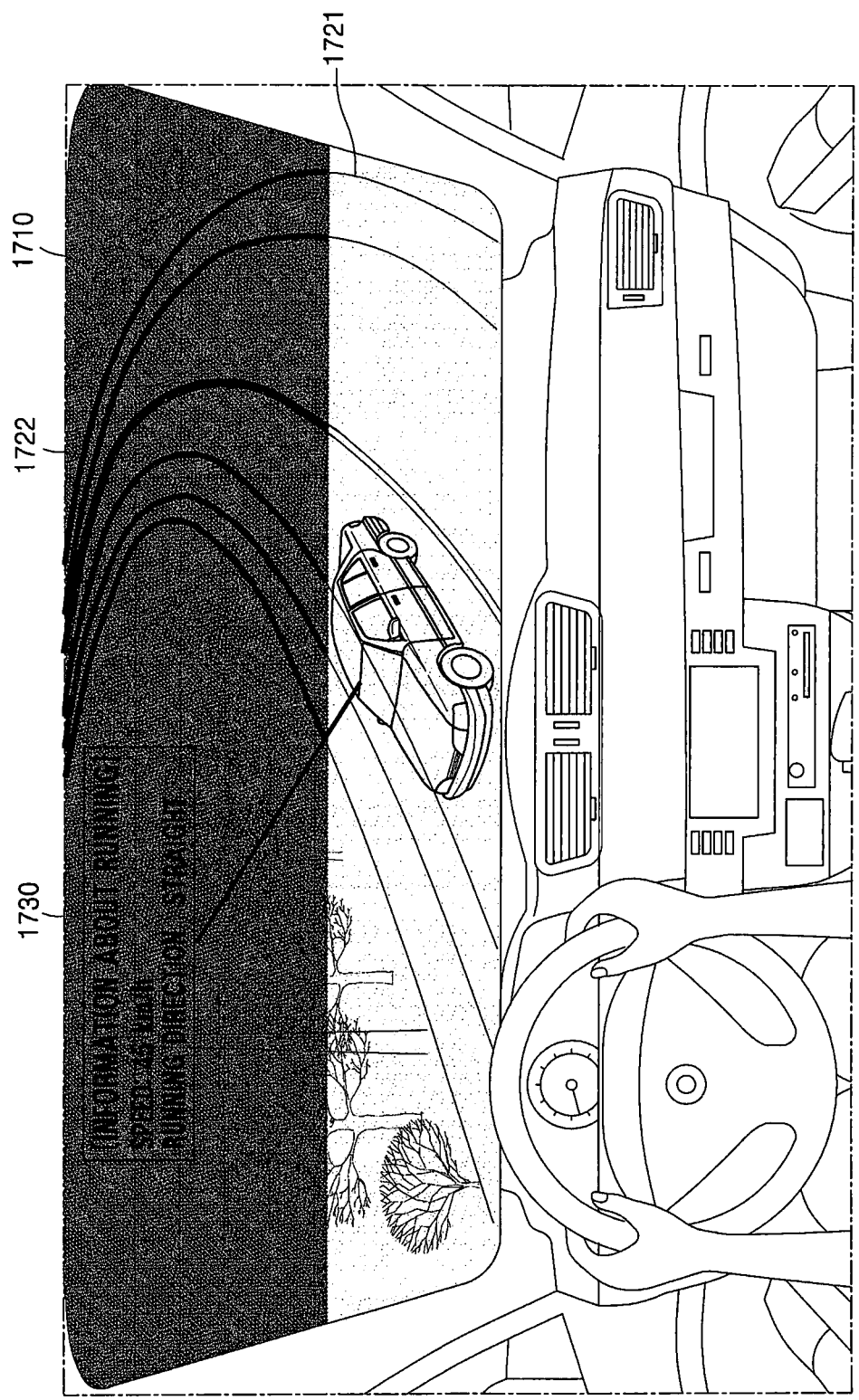
FIG. 17 is a view for explaining another example of a guide image according to an embodiment.

FIG. 17 is a view for explaining another example of a guide image according to an embodiment.

FIG. 17 shows a guide image 1710 output to a window of a vehicle. The guide image 1710 may include not only a lane 1721 of a visible area but also a lane 1722 of an invisible area. The lane 1721 and the lane 1722 may be displayed separately from each other as described above with reference to FIG. 13.

The guide image 1710 may include information 1730 about another vehicle running on the road. For example, a sensor included in the vehicle may sense the speed, running direction, etc. of another vehicle, and the processor may display information 1730 about the other vehicle on the window of the vehicle.

Figure 18:
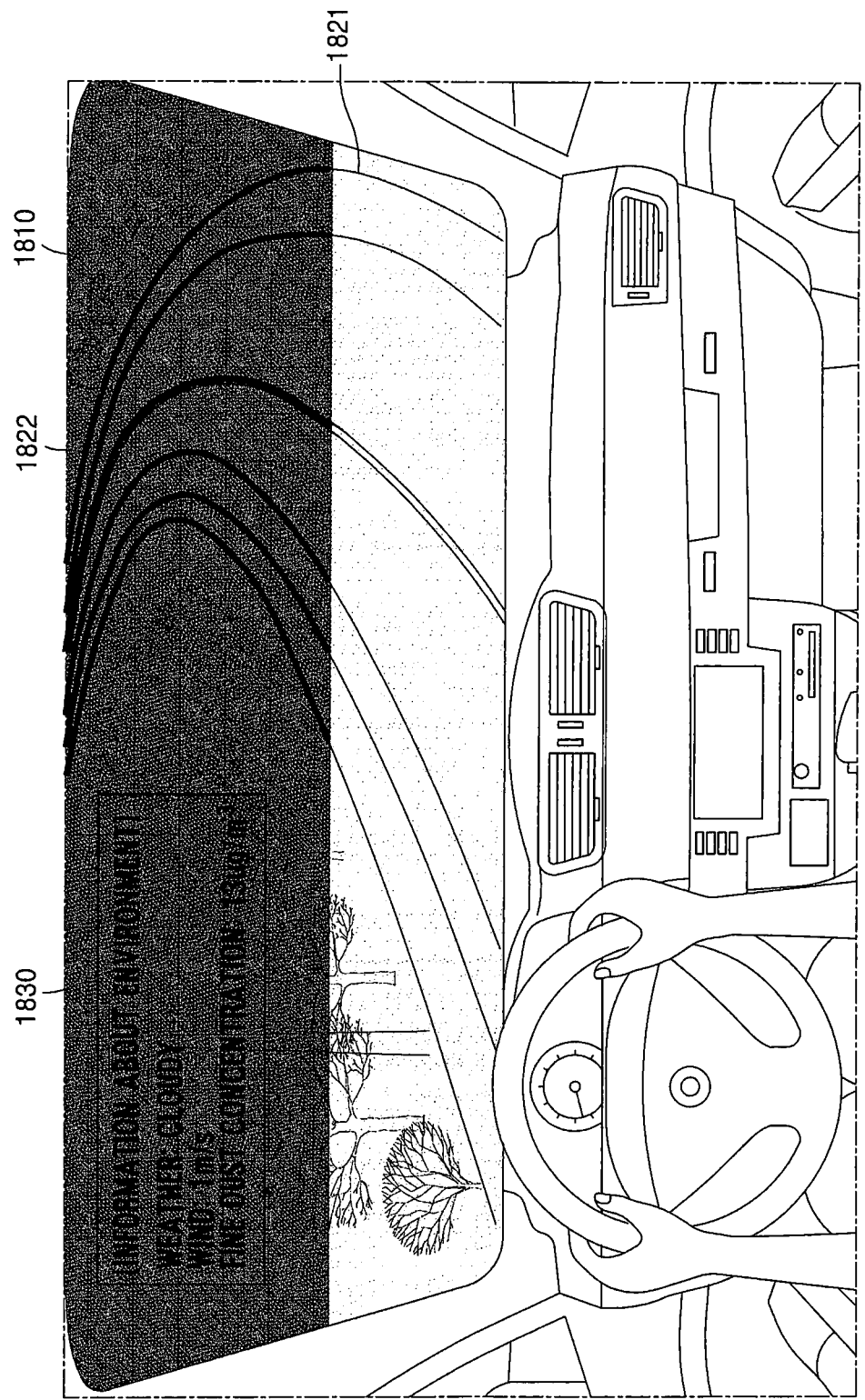
FIG. 18 is a view for explaining another example of a guide image according to an embodiment.

FIG. 18 is a view for explaining another example of a guide image according to an embodiment.

FIG. 18 shows a guide image 1810 output to a window of a vehicle. The guide image 1810 may include not only a lane 1821 of a visible area but also a lane 1822 of an invisible area. The lane 1821 and the lane 1822 may be displayed separately from each other as described above with reference to FIG. 13.

The guide image 1710 may include information 1830 about an environment around the vehicle. For example, the processor may obtain information about a wind direction, wind speed, and the concentration of fine dust around the vehicle through a sensor unit, and may determine the current weather (e.g., clear, cloudy, foggy, rainy, etc.). For example, the processor may detect fine dust of about PM2.5 to about PM10 (i.e., about 2.5 um to about 10 um) through an environmental sensor. In addition, the processor may determine whether the vehicle is running at daytime or at night, through the sensor unit. In addition, the processor may determine whether the current weather is bad weather. For example, when the vehicle is running at night or a lane recognition rate through a camera is equal to or less than 50% due to precipitation, rain, fine dust, fog, etc., the processor may determine that the current weather is bad weather. The processor may display the information 1830 about an environment around the vehicle on a window of the vehicle. For example, the processor may display the information 1830 about an environment around the vehicle at certain values, or may display the information 1930 as an indicator such as various colors or risk levels.

Although not shown in FIG. 18, the processor may obtain information about whether the road is an uphill road or a downhill road through a camera and a sensor included in the vehicle, and may calculate a slope of the road. The processor may display information about the road on a window of the vehicle.

The processor may change the brightness, transparency, etc. of an image displayed on the window of the vehicle, according to the environment around the vehicle. FIGS. 13 to 18 illustrate examples in which the guide images 1310, 1410, 1510, 1610, 1710, and 1810 are displayed as pop-up windows on windows of vehicles, respectively, but the present disclosure is not limited thereto.

Figure 19:
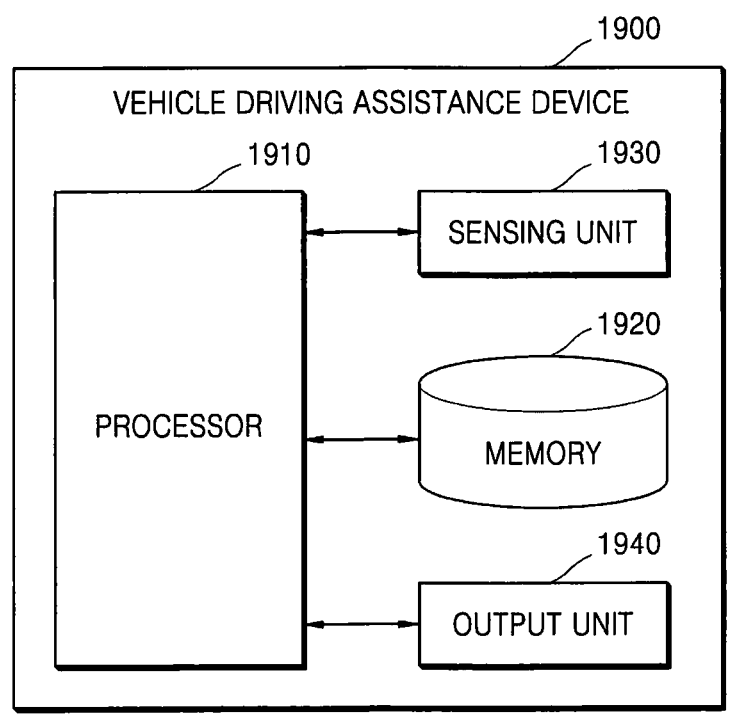
FIGS. 19 and 20 are block diagrams showing examples of a vehicle driving assistance device including a processor according to an embodiment.
Figure 20:
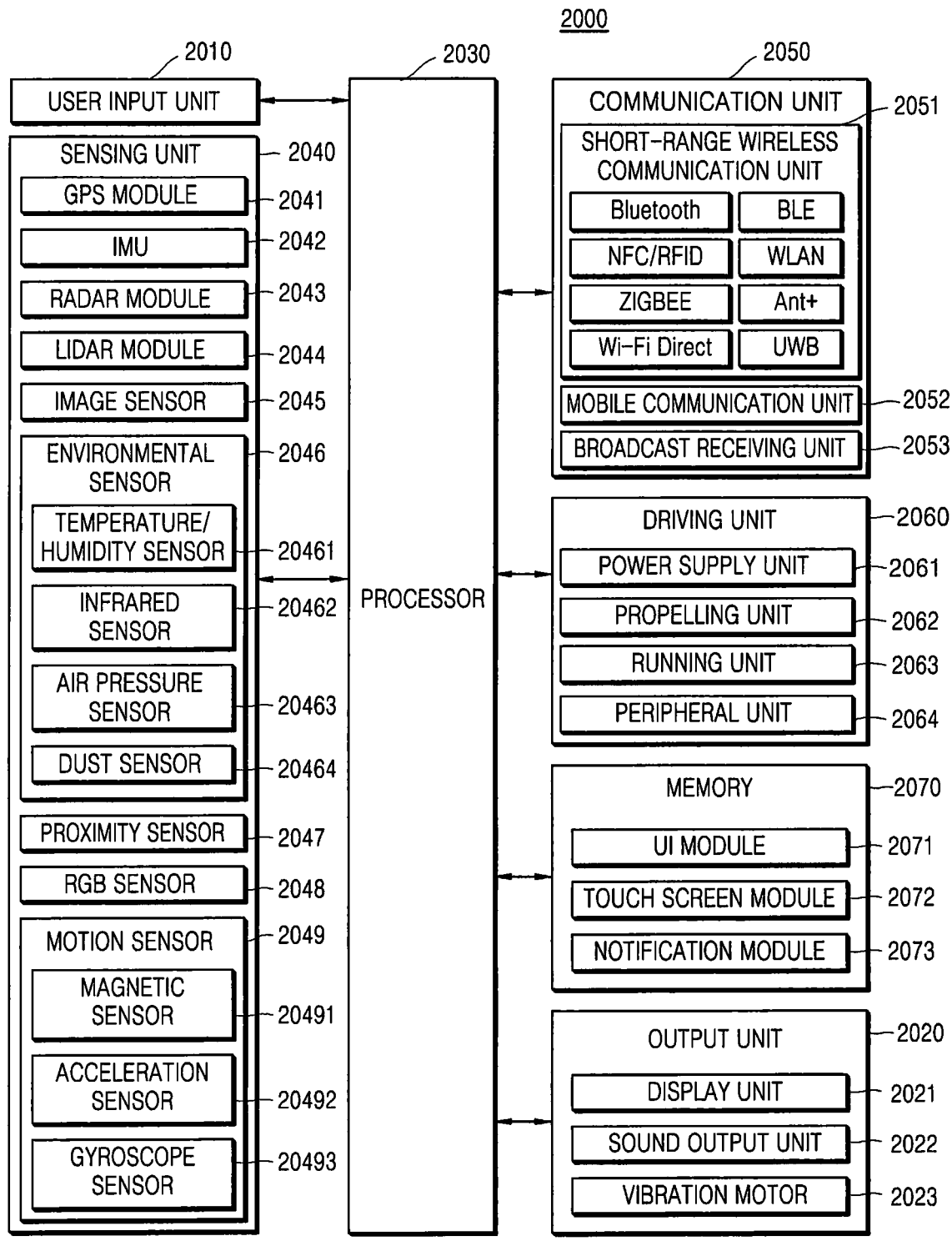

FIGS. 19 and 20 are block diagrams showing examples of a vehicle driving assistance device including a processor according to an embodiment.

Referring to FIG. 19, a vehicle driving assistance device 1900 includes a processor 1810, a memory 1820, a sensing unit 1930, and an output unit 1940.

However, not all of the components shown in FIG. 19 are essential components of the vehicle driving assistance device 1900. The vehicle driving assistance device 1900 may be configured with more components than those shown in FIG. 19 or with less components than those shown in FIG. 19.

For example, as shown in FIG. 20, a vehicle driving assistance device 2000 may include a user input unit 2010, a communication unit 2050, and a driving unit 2060 in addition to a processor 2030, a memory 2070, a sensing unit 2040, and an output unit 2020.

The user input unit 2010 refers to a unit through which a user inputs data for controlling the vehicle driving assistance device 2000. For example, the user input unit 2010 may include a key pad, a dome switch, a touch pad (a contact-based capacitive type, a pressure-based resistive type, an infrared detection type, a surface ultrasonic wave conduction type, an integral tension measurement type, a piezo effect type, etc.), a jog wheel, a jog switch, and the like, but is not limited thereto.

The user input unit 2010 may receive a user input for requesting a response message to the user's voice input and performing an operation related to the response message.

The output unit 2020 may output an audio signal, a video signal, or a vibration signal. The output unit 2020 may include at least one of a display unit 2021, a sound output unit 2022, and a vibration motor 2023, but is not limited thereto.

The display unit 2021 displays and outputs information to be processed in the vehicle driving assistance device 2000. For example, the display unit 2021 may display a user interface for requesting a response message to the user's voice input and performing an operation related to the response message. Also, the display unit 2021 may display a three-dimensional image representing the surroundings of a vehicle.

The sound output unit 2022 outputs audio data received from the communication unit 2050 or stored in the memory 2070. Also, the sound output unit 2022 outputs sound signals related to functions (e.g., call signal reception sound, message reception sound, and alarm sound) performed in the vehicle driving assistance device 2000.

The processor 2030 typically controls the overall operation of the vehicle driving assistance device 2000. For example, the processor 2030 may execute programs stored in the memory 2070 to thereby control the user input unit 2010, the output unit 2020, the sensing unit 2040, the communication unit 2050, the driving unit 2060, and the like. In addition, the processor 2030 may execute the functions described above with reference to FIGS. 1 to 18 by executing programs stored in the memory 2070. For example, the processor 2030 may be a microcontroller unit (MCU). The processor 2030 may also perform the function of a cognitive processor.

For example, the processor 2030 may detect a lane included in a visible area of an image by using an image of a road captured by a camera. The processor 2030 may detect objects around a road by using a radar/lidar module and estimate a lane included in an invisible area in the image based on the locations of the detected objects. The processor 2030 may generate a guide image for guiding the running of the vehicle based on the shapes of a detected lane and an estimated lane. The processor 2030 may output the guide image.

In addition, the processor 2030 may distinguish the visible area from the invisible area in the image of the road and detect the lane included in the visible area. The processor 2030 may calculate the length (i.e., the distance from the vehicle to an endpoint of the detected lane) of the visible area.

In addition, the processor 2030 may classify the objects detected through the radar/lidar module into objects in the visible area and objects in the invisible area. The processor 2030 may estimate a lane included in the invisible area based on the location of each of the objects in the invisible area.

The sensing unit 2040 may sense the state of the vehicle driving assistance device 2000 and transmit sensed information to the processor 2030. Also, the sensing unit 2040 may be used to obtain or generate context information indicating a surrounding situation (e.g., the presence or absence of an object) of the user or the vehicle.

The sensing unit 2040 may include at least one of a global positioning system (GPS) module 2041, an inertial measurement unit (IMU) 2042, a radar module 2043, a lidar module 2044, an image sensor 2045, an environmental sensor 2046, a proximity sensor 2047, an RGB sensor (i.e., illuminance sensor) 2048, and a motion sensor 2049. However, the present disclosure is not limited thereto. Functions of components included in the sensing unit 2040 may be intuitively inferred by one of ordinary skill in the art from their names, and thus, detailed description thereof will be omitted.

The GPS module 2041 may be used to estimate the geographic location of the vehicle. In other words, the GPS module 2041 may include a transceiver configured to estimate the location of the vehicle on the earth.

The IMU 2042 may be used to sense the location of the vehicle and orientation changes based on inertial acceleration. For example, the IMU 2042 may include accelerometers and gyroscopes.

The radar module 2043 may be used to detect objects in an environment around the vehicle by using radio signals. The radar module 2043 may also sense the velocities and/or directions of objects.

The lidar module 2044 may be used to detect objects in an environment around the vehicle by using lasers. Specifically, the lidar module 2044 may include a laser light source and/or a laser scanner configured to emit a laser, and a detector configured to detect the reflection of the laser. The lidar module 2044 may be configured to operate in a coherent (e.g., using heterodyne detection) or incoherent detection mode.

The image sensor 2045 may include a camera used to generate images representing the interior and exterior of the vehicle. For example, the camera may be, but is not limited to, a mono camera, a stereo camera, an infrared camera, or a thermal imaging camera. The image sensor 2045 may include a plurality of cameras, and the plurality of cameras may be arranged at a plurality of locations inside and outside the vehicle.

The environmental sensor 2046 may be used to sense an external environment of the vehicle, the external environment including the weather. For example, the environmental sensor 2046 may include a temperature/humidity sensor 20461, an infrared sensor 20462, an air pressure sensor 20463, and a dust sensor 20464.

The proximity sensor 2047 may be used to sense objects approaching the vehicle.

The RGB sensor 2048 may be used to detect the color intensity of light around the vehicle.

The motion sensor 2049 may be used to sense the motion of the vehicle. For example, the motion sensor 2049 may include a magnetic sensor 20491, an acceleration sensor 20492, and a gyroscope sensor 20493.

The communication unit 2050 may include one or more components that allow the vehicle driving assistance device 2000 to communicate with another device of the vehicle, an external device, or an external server. The external device may be a computing device or a sensing device, but is not limited thereto. For example, the communication unit 2050 may include at least one of a short-range wireless communication unit 2051, a mobile communication unit 2052, and a broadcast receiving unit 2053, but is not limited thereto.

Examples of the short-range wireless communication unit 2051 may include a Bluetooth communication unit, a Bluetooth low energy (BLE) communication unit, a near field communication (NEC) unit, a wireless local area network (WLAN) communication unit, a Zigbee communication unit, an infrared data association (IrDA) communication unit, a Wi-Fi direct (WFD) communication unit, an ultra wideband (UWB) communication unit, and the like, but is not limited thereto.

The mobile communication unit 2052 transmits and receives radio signals to and from at least one of a base station, an external terminal, and a server on a mobile communication network. In this case, the radio signals may include a voice call signal, a video call signal, or various types of data according to text/multimedia message transmission and reception.

The broadcast receiving unit 2053 receives broadcast signals and/or broadcast-related information from the outside through a broadcast channel. The broadcast channel may include a satellite channel and a terrestrial channel. The vehicle driving assistance device 2000 may not include the broadcast receiving unit 2053, according to an embodiment.

In addition, the communication unit 2050 may transmit and receive, to and from an external device and an external server, information required for requesting a response message to the user's voice input and performing an operation related to the response message.

The driving unit 2060 may include configurations used for driving the vehicle and for operating devices in the vehicle. The driving unit 2060 may include at least one of a power supply unit 2061, a propelling unit 2062, a running unit 2063, and a peripheral unit 2064, but is not limited thereto.

The power supply unit 2061 may be configured to provide power to some or all of the vehicle's components. For example, the power supply unit 2061 may include a rechargeable lithium ion or lead-acid battery.

The propelling unit 2062 may include an engine/motor, an energy source, a transmission, and a wheel/tire.

The engine/motor may include any combination between an internal combustion engine, an electric motor, a steam engine, and a Stirling engine. For example, when the vehicle is a gas-electric hybrid car, the engine/motor may include a gasoline engine and an electric motor.

The energy source may include a source of energy that provides power to the engine/motor in whole or in part. That is, the engine/motor may be configured to convert energy of an energy source into mechanical energy. The energy source may include at least one of gasoline, diesel, propane, other compressed gas-based fuels, ethanol, a solar panel, a battery, and other electric power sources. Alternatively, the energy source may include at least one of a fuel tank, a battery, a capacitor, and a flywheel. The energy source may provide energy to the vehicle's system and devices.

The transmission may be configured to transmit mechanical power from the engine/motor to the wheel/tire. For example, the transmission may include at least one of a gear box, a clutch, a differential, and a drive shaft. When the transmission includes drive shafts, the drive shafts may include one or more axles configured to engage the wheel/tire.

The wheel/tire may be configured in various formats including a unicycle, bicycle/motorbike, tricycle, or car/truck four wheel format. For example, other wheel/tire formats, such as those that include more than six wheels, may be possible. The wheel/tire may include at least one wheel fixedly attached to the transmission 213, and at least one tire coupled to a rim of the at least one wheel that may contact a driving surface.

The running unit 2063 may include a brake unit, a steering unit, and a throttle.

The brake unit may include a combination of mechanisms configured to decelerate the vehicle. For example, the brake unit may use friction to reduce the speed of the wheel/tire.

The steering unit may include a combination of mechanisms configured to adjust the orientation of the vehicle.

The throttle may include a combination of mechanisms configured to control the operation speed of the engine/motor to control the speed of the vehicle. Furthermore, the throttle may control the amount of a mixed gas of a fuel air flowing into the engine/motor by adjusting a throttle opening amount, and may control power and thrust by adjusting the throttle opening amount.

The peripheral unit 2064 may include a navigation system, a light, a turn signal, a wiper, an internal light, a heater, and an air conditioner.

In this case, the navigation system may be a system configured to determine a driving route for the vehicle. The navigation system may be configured to dynamically update the driving route while the vehicle is running. For example, the navigation system may use data collected by the GPS module 2041 to determine the driving route for the vehicle.

The memory 2070 may store a program for handling and controlling the processor 2030 and may store data transmitted to an external device or an external server, or received from the external device or the external server.

For example, the memory 2070 may store road/lane information included in a certain area or space and geometric information of a road. In addition, the memory 2070 may store information about an object detected by a camera and/or a radar/lidar module and may update previously stored information about an object and store the updated information. In addition, the memory 2070 may store information about the length of the visible area and the length of the invisible area. In addition, the memory 2070 may store information about the curvature of the road calculated by the processor 2030, and when the processor 2030 performs the curvature calculation multiple times on the same road, the memory 2070 may update previously stored curvature information and store the updated curvature information. In addition, the memory 2070 may store information about the length of the visible area that may be secured according to a driving environment (weather, day/night, etc.).

The memory 1100 may include at least one type of storage medium among a memory (e.g., SD or XD memory) of a flash memory type, a hard disk type, a multimedia card micro type, or a card type, random access memory (RAM), static random access memory (SRAM), read only memory (ROM), electrically erasable programmable read-only memory (EEPROM), programmable read-only memory (PROM), a magnetic memory, a magnetic disk, and an optical disk.

The programs stored in the memory 2070 may be classified into a plurality of modules according to their functions. For example, the memory 2070 may include at least one of a user interface (UI) module 2071, a touch screen module 2072, and a notification module 2073, but is not limited thereto.

The UI module 2071 may provide a specialized UI or GUI and the like that are associated with the vehicle driving assistance device 2000 for each application. The touch screen module 2072 may sense a user's touch gesture on a touch screen and transmit information about the user's touch gesture to the processor 1300. The touch screen module 2072 according to an embodiment may recognize a touch code and analyse the touch code. The touch screen module 2072 may be configured with separate hardware including a controller.

The notification module 2073 may generate a signal for notifying event occurrence of the vehicle driving assistance device 2000. Examples of events that occur in the vehicle driving assistance device 2000 may include call signal reception, message reception, key signal input, schedule notification, etc. The notification module 2073 may output a notification signal as a video signal through the display unit 2021, an audio signal through the sound output unit 2022, or a vibration signal through the vibration motor 2023.

According to the above description, the processor 2030 may accurately output information about a lane on which the vehicle is running, regardless of an environment around the vehicle. In addition, the processor 2030 may output various types of information necessary for the vehicle to run. Thus, driving safety may be enhanced, and the driver's driving satisfaction may be enhanced.

The above-described method may be written as a program that is executable in a computer and may be implemented in a general-purpose digital computer that operates the program by using a computer-readable recording medium. In addition, the structure of data used in the above-described method may be recorded on a computer-readable recording medium through various means. The computer-readable recording medium includes a storage medium such as a magnetic storage medium (e.g., ROM, RAM, USB, floppy disk, or hard disk) and an optical reading medium (e.g., CD ROM or DVD).

In addition, the above-described method may be performed through execution of instructions contained in at least one of programs stored in a computer-readable recording medium. When the instructions are executed by a computer, the computer may perform a function corresponding to the instructions. In this case, the instructions may include machine language code such as that generated by a compiler, as well as high-level language code that may be executed by a computer by using an interpreter or the like. In the present disclosure, an example of a computer may be a processor, and an example of a recording medium may be a memory.

It will be understood by one of ordinary skill in the art that various changes in form and details may be made therein without departing from the spirit and scope of the invention as defined by the appended claims. Therefore, the disclosed methods have to be considered from an illustrative point of view, not from a restrictive point of view. The scope of the present disclosure is defined by the appended claims rather than by the foregoing description, and all differences within the scope of equivalents thereof have to be construed as being included in the present disclosure.

The invention claimed is:

1. A driving assistance device in a vehicle, the device comprising:
   a camera configured to obtain a front image of the vehicle;
   at least one sensor;
   a display; and
   a processor configured to:
   obtain a part of a lane and at least one first object included in a visible area of the front image based on the front image;
   detect at least one second object based on a signal transmitted from the sensor;

compare the at least one first object with the at least one second object;

based on the comparing, determine that the at least one second object is included in an invisible area of the front image;

determine a curvature of road based on a location of the at least one second object;

obtain another part of the lane included in the invisible area of the front image based on the determined curvature, wherein the determined curvature is in the invisible area of the front image; and control the display to output the obtained another part of the lane.

2. The device of claim 1, wherein
the at least one sensor comprises at least one of a radar module and a lidar module.

3. The device of claim 1, wherein
the display is configured to output a guide image generated based on the obtained part of the lane included in the visible area and the obtained another part of the lane included in the invisible area.

4. The device of claim 1, wherein
the processor is further configured to distinguish the visible area in the front image from the invisible area in the front image, and obtain a distance from the vehicle to an endpoint of the obtained part of the lane included in the visible area.

5. The device of claim 1, wherein
the processor is further configured to generate an alarm image corresponding to a risk determined based on a state of the vehicle and an environment around the vehicle.

6. The device of claim 1, wherein
the processor is further configured to generate a guide image representing a speed of the vehicle, a direction in which the vehicle runs, and the at least one second object located around the vehicle.

7. The device of claim 1, further comprising:
a communication device configured to transmit a guide image representing the obtained part of the lane included in the visible area and the obtained other part of the lane included in the invisible area to an external device.

8. The device of claim 1, wherein
the display comprises at least one of a head-up display, a mirror display, and a central information display included in the vehicle.

9. The device of claim 1, further comprising:
a memory configured to store a guide image representing the obtained part of the lane included in the visible area and the obtained another part of the lane included in the invisible area.

10. A method of outputting lane information, the method comprising:

obtaining a front image of a vehicle by a camera;

obtaining a part of a lane and at least one first object included in a visible area of the front image based on the front image;

detecting at least one second object based on a signal transmitted from a sensor;

comparing the at least one first object with the at least one second object;

based on the comparing, determining that the at least one second object is included in an invisible area of the front image;

determining a curvature of road based on a location of the at least one second object;

obtaining another part of the lane included in the invisible area of the front image based on the determined curvature, wherein the determined curvature is in the invisible area of the front image; and outputting the obtained another part of the lane to a display.

11. The method of claim 10, wherein
the sensor comprises at least one of a radar module and a lidar module.

12. The method of claim 11, wherein
outputting the obtained another part of the lane comprises outputting a guide image generated based on the obtained part of the lane included in the visible area and the obtained another part of the lane included in the invisible area.

13. The method of claim 11, wherein
the display comprises at least one of a head-up display, a mirror display, and a central information display included in the vehicle.

14. A non-transitory computer readable recording medium comprising a program, which when executed by a processor, causes the processor to:

obtain a front image of a vehicle by a camera;

obtain a part of a lane and at least one first object included in a visible area of the front image based on the front image;

detect at least one second object based on a signal transmitted from a sensor;

compare the at least one first object with the at least one second object;

based on the comparing, determine that the at least one second object is included in an invisible area of the front image;

determine a curvature of road based on a location of the at least one second object;

obtain another part of the lane included in the invisible area of the front image based on the determined curvature, wherein the determined curvature is in the invisible area of the front image; and output the obtained another part of the lane to a display.

* * * * *